US012323899B2

(12) United States Patent
Huang et al.

(10) Patent No.: US 12,323,899 B2
(45) Date of Patent: Jun. 3, 2025

(54) CONTROL OF DISCOVERY SIGNAL TRANSMISSION BETWEEN USER EQUIPMENT

(71) Applicant: QUALCOMM Incorporated, San Diego, CA (US)

(72) Inventors: Min Huang, Beijing (CN); Chao Wei, Beijing (CN); Jing Dai, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 294 days.

(21) Appl. No.: 17/785,388

(22) PCT Filed: Dec. 20, 2019

(86) PCT No.: PCT/CN2019/126864
§ 371 (c)(1),
(2) Date: Jun. 14, 2022

(87) PCT Pub. No.: WO2021/120144
PCT Pub. Date: Jun. 24, 2021

(65) Prior Publication Data
US 2023/0020567 A1    Jan. 19, 2023

(51) Int. Cl.
*H04W 40/24* (2009.01)
*H04W 76/14* (2018.01)
*H04W 88/04* (2009.01)

(52) U.S. Cl.
CPC ......... *H04W 40/246* (2013.01); *H04W 76/14* (2018.02); *H04W 88/04* (2013.01)

(58) Field of Classification Search
CPC ... H04W 40/246; H04W 76/14; H04W 88/04; H04W 8/005; H04W 84/18; H04W 16/26;
(Continued)

(56) References Cited

U.S. PATENT DOCUMENTS

2015/0230180 A1    8/2015  Lim et al.
2015/0334555 A1   11/2015  Seo et al.
(Continued)

FOREIGN PATENT DOCUMENTS

CN    106416370 A        2/2017
EP      3157292 A1  *    4/2017   ............ H04W 40/20
WO   WO-2015026111 A1    2/2015

OTHER PUBLICATIONS

"3rd Generation Partnership Project; Technical Specification Group Services and System Aspects; Proximity-Based Services (ProSe); Stage 2 (Release 15)", 3GPP Standard, Technical Specification, 3GPP TS 23.303, 3rd Generation Partnership Project (3GPP), Mobile Competence Centre, 650, Route Des Lucioles, F-06921 Sophia-Antipolis Cedex, France, V15.1.0, Jun. 30, 2018 (Jun. 30, 2018), pp. 1-130, XP051472857, Retrieved from the Internet: URL: https://www.3gpp.org/ftp/Specs/archive/23_series/23.303/23303-f10.zip. [retrieved on May 5, 2021], The whole document, sections 4.5.1.1.2.3.3 and 4.6.4.10.

(Continued)

*Primary Examiner* — Mewale A Ambaye
(74) *Attorney, Agent, or Firm* — Loza & Loza, LLP/QUALCOMM Incorporated

(57) ABSTRACT

Aspects of the disclosure relate to control of discovery signal transmissions for D2D communication. A first UE may transmit a discovery signal initiation message to at least a second UE to control transmission of a discovery signal from the second UE to a third UE. The second UE may identify a discovery signal monitoring duration of the second UE during which the second UE monitors for transmitted discovery signals transmitted from other UEs to the third UE. At expiration of the discovery signal monitoring duration, the second UE may transmit a discovery signal to the third UE when the number of transmitted discovery signals (Continued)

transmitted from the other UEs during the discovery signal monitoring duration is less than a discovery signal transmission number threshold.

34 Claims, 12 Drawing Sheets

(58) Field of Classification Search
CPC ... H04W 84/07; H04W 40/22; H04W 40/244; H04W 76/23
See application file for complete search history.

(56) References Cited

U.S. PATENT DOCUMENTS

| | | | |
|---|---|---|---|
| 2016/0269885 A1 | 9/2016 | Kim et al. | |
| 2017/0359766 A1 | 12/2017 | Agiwal et al. | |
| 2018/0084442 A1 | 3/2018 | Lee et al. | |
| 2018/0139787 A1* | 5/2018 | Islam | H04W 74/0891 |
| 2019/0253869 A1* | 8/2019 | Xu | H04W 40/246 |
| 2020/0228959 A1* | 7/2020 | Park | H04W 8/005 |
| 2021/0392506 A1* | 12/2021 | Luong | H04W 74/006 |
| 2022/0159553 A1* | 5/2022 | Ly | H04L 5/0007 |
| 2023/0164658 A1* | 5/2023 | Ishii | H04W 36/0055 370/331 |
| 2023/0199879 A1* | 6/2023 | Zhu | H04W 36/0033 370/329 |
| 2023/0309171 A1* | 9/2023 | Zhou | H04W 72/23 |

OTHER PUBLICATIONS

International Search Report and Written Opinion—PCT/CN2019/126864—ISA/EPO—Sep. 23, 2020.
Sony: "Relay Measurements and Selection/Reselection", 3GPP TSG RAN WG2 Meeting #91, R2-153128 D2D Relay Measurements, 3rd Generation Partnership Project (3GPP), Mobile Competence Centre, 650, Route Des Lucioles, F-06921 Sophia-Antipolis Cedex, France, vol. RAN WG2, No. Beijing, China, Aug. 24, 2015-Aug. 28, 2015, Aug. 23, 2015, XP051003935, 4 pages, 2. Discovery signal triggering 4. Conclusion (Proposal 3).
Supplementary European Search Report—EP19956641—Search Authority—The Hague—Jul. 17, 2023.
ZTE: "Discussions on Relay UE Selection and Discovery", 3GPP TSG-RAN WG1 Meeting #81, R1-152966, Relay UE Selection and Discovery, 3rd Generation Partnership Project (3GPP), Mobile Competence Centre, 650, Route Des Lucioles, F-06921 Sophia-Antipolis Cedex, France, vol. RAN WG1, No. Fukuoka, Japan, May 25, 2015-May 29, 2015, May 24, 2015, XP050972166, 5 Pages, section 2, p. 1-2, figure 1 section 3, p. 2-3, figures 2,3 section 3.2, p. 4.
3GPP TR 36.746: "3rd Generation Partnership Project, Technical Specification Group Radio Access Network, Study on further Enhancements to LTE Device to Device (D2D), User Equipment (UE) to Network Relays for Internet of Things (IoT) and Wearables, (Release 15)", 3GPP TR 36.746 V15.1.1, Apr. 2018, pp. 1-55.

\* cited by examiner

CONTROL OF DISCOVERY SIGNAL TRANSMISSION BETWEEN USER EQUIPMENT

CROSS-REFERENCE TO RELATED APPLICATION(S)

This application is the U.S. national stage of PCT patent application number PCT/CN2019/126864 filed on Dec. 20, 2019.

TECHNICAL FIELD

The technology discussed below relates generally to wireless communication networks, and more particularly, to control of discovery signal transmissions between user equipment (UEs) for device-to-device (D2D) communication.

INTRODUCTION

Communication networks have used relays in varying capacities. Relaying in cellular networks seeks to extend base station coverage, improve transmission reliability, and recover failed links due to, for example, blockage or fading. A relaying node may be a fixed node or a mobile device (e.g., a user equipment (UE)). Relaying between mobile devices may be achieved using D2D technology. D2D allows UEs to communicate over direct links, referred to herein as sidelinks, instead of through cellular network infrastructure.

D2D communications may use various frequency bands. In fifth-generation wireless technology, or 5G, D2D relaying may employ millimeter wave (mmWave) frequency transmissions in the range of 24 to 52.6 gigahertz (GHz) or more. In addition, due to the high propagation loss experienced by mmWaves, wireless devices may utilize highly directional antenna beams to facilitate mmWave communication.

As the demand for 5G wireless communication increases, research and development continue to advance 5G technologies not only to meet the growing demand for 5G wireless communication, but also to advance and enhance the user experience.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a method for wireless communication at a first user equipment (UE) in a wireless communication network is disclosed. The method includes identifying a discovery signal monitoring duration and a discovery signal transmission number threshold, receiving a discovery signal initiation message from a second UE, and initiating discovery signal monitoring for the discovery signal monitoring duration upon receiving the discovery signal initiation message from the second UE. The method further includes, upon expiration of the discovery signal monitoring duration, determining whether a number of transmitted discovery signals transmitted from other UEs is less than the discovery signal transmission number threshold, and when the number of transmitted discovery signals transmitted from the other UEs is less than the discovery signal transmission number threshold, transmitting a discovery signal to a third UE.

Another example provides a first user equipment (UE) configured for wireless communication. The first UE includes a processor, a memory communicatively coupled to the processor, and a transceiver communicatively coupled to the processor. The processor and the memory are configured to identify a discovery signal monitoring duration and a discovery signal transmission number threshold, receive a discovery signal initiation message from a second UE, and initiate discovery signal monitoring for the discovery signal monitoring duration upon receiving the discovery signal initiation message from the second UE. The processor and the memory are further configured to, upon expiration of the discovery signal monitoring duration, determine whether a number of transmitted discovery signals transmitted from other UEs is less than the discovery signal transmission number threshold, and when the number of transmitted discovery signals transmitted from the other UEs is less than the discovery signal transmission number threshold, transmit a discovery signal to a third UE.

Another example provides a first user equipment (UE) configured for wireless communication. The first UE includes means for identifying a discovery signal monitoring duration and a discovery signal transmission number threshold, means for receiving a discovery signal initiation message from a second UE, and means for initiating discovery signal monitoring for the discovery signal monitoring duration upon receiving the discovery signal initiation message from the second UE. The first UE further includes, means for determining whether a number of transmitted discovery signals transmitted from other UEs is less than the discovery signal transmission number threshold upon expiration of the discovery signal monitoring duration, and means for transmitting a discovery signal to a third UE when the number of transmitted discovery signals transmitted from the other UEs is less than the discovery signal transmission number threshold.

Another example provides a computer readable medium storing computer executable code including instructions for causing a first user equipment (UE) to identify a discovery signal monitoring duration and a discovery signal transmission number threshold, receive a discovery signal initiation message from a second UE, and initiate discovery signal monitoring for the discovery signal monitoring duration upon receiving the discovery signal initiation message from the second UE. The computer readable medium further includes instruction for causing the first UE to, upon expiration of the discovery signal monitoring duration, determine whether a number of transmitted discovery signals transmitted from other UEs is less than the discovery signal transmission number threshold, and when the number of transmitted discovery signals transmitted from the other UEs is less than the discovery signal transmission number threshold, transmit a discovery signal to a third UE.

Another example provides method of wireless communication at a first user equipment (UE) in a wireless communication network. The method includes communicating with a second UE via a sidelink, and transmitting a discovery signal initiation message to at least a third UE to control transmission of a discovery signal from the third UE to the second UE based on a discovery signal monitoring duration during which the third UE monitors for transmitted discovery signals transmitted from other UEs to the second UE.

Another example provides a first user equipment (UE) configured for wireless communication. The first UE includes a processor, a memory communicatively coupled to the processor, and a transceiver communicatively coupled to the processor. The processor and the memory are configured to communicate with a second UE via a sidelink, and transmit a discovery signal initiation message to at least a third UE to control transmission of a discovery signal from the third UE to the second UE based on a discovery signal monitoring duration during which the third UE monitors for transmitted discovery signals transmitted from other UEs to the second UE.

Another example provides a first user equipment (UE) configured for wireless communication. The first UE includes means for communicating with a second UE via a sidelink, and means for transmitting a discovery signal initiation message to at least a third UE to control transmission of a discovery signal from the third UE to the second UE based on a discovery signal monitoring duration during which the third UE monitors for transmitted discovery signals transmitted from other UEs to the second UE.

Another example provides a computer readable medium storing computer executable code including instructions for causing a first user equipment (UE) to communicate with a second UE via a sidelink, and transmit a discovery signal initiation message to at least a third UE to control transmission of a discovery signal from the third UE to the second UE based on a discovery signal monitoring duration during which the third UE monitors for transmitted discovery signals transmitted from other UEs to the second UE.

Another example provides method of wireless communication at a base station in a wireless communication network. The method includes communicating with at least a first user equipment (UE) in the wireless communication network, and transmitting at least one of a discovery signal transmission number threshold or a discovery signal monitoring parameter to at least the first UE to control transmission of a discovery signal from the first UE to a second UE based on a discovery signal monitoring duration during which the first UE monitors for transmitted discovery signals transmitted from other UEs to the second UE.

Another example provides a base station configured for wireless communication. The base station includes a processor, a memory communicatively coupled to the processor, and a transceiver communicatively coupled to the processor. The processor and the memory are configured to communicate with at least a first user equipment (UE) in the wireless communication network, and transmit at least one of a discovery signal transmission number threshold or a discovery signal monitoring parameter to at least the first UE to control transmission of a discovery signal from the first UE to a second UE based on a discovery signal monitoring duration during which the first UE monitors for transmitted discovery signals transmitted from other UEs to the second UE.

Another example provides a base station configured for wireless communication. The base station includes means for communicating with at least a first user equipment (UE) in the wireless communication network, and means for transmitting at least one of a discovery signal transmission number threshold or a discovery signal monitoring parameter to at least the first UE to control transmission of a discovery signal from the first UE to a second UE based on a discovery signal monitoring duration during which the first UE monitors for transmitted discovery signals transmitted from other UEs to the second UE.

Another example provides a computer readable medium storing computer executable code including instructions for causing a base station to communicate with at least a first user equipment (UE) in the wireless communication network, and transmit at least one of a discovery signal transmission number threshold or a discovery signal monitoring parameter to at least the first UE to control transmission of a discovery signal from the first UE to a second UE based on a discovery signal monitoring duration during which the first UE monitors for transmitted discovery signals transmitted from other UEs to the second UE.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
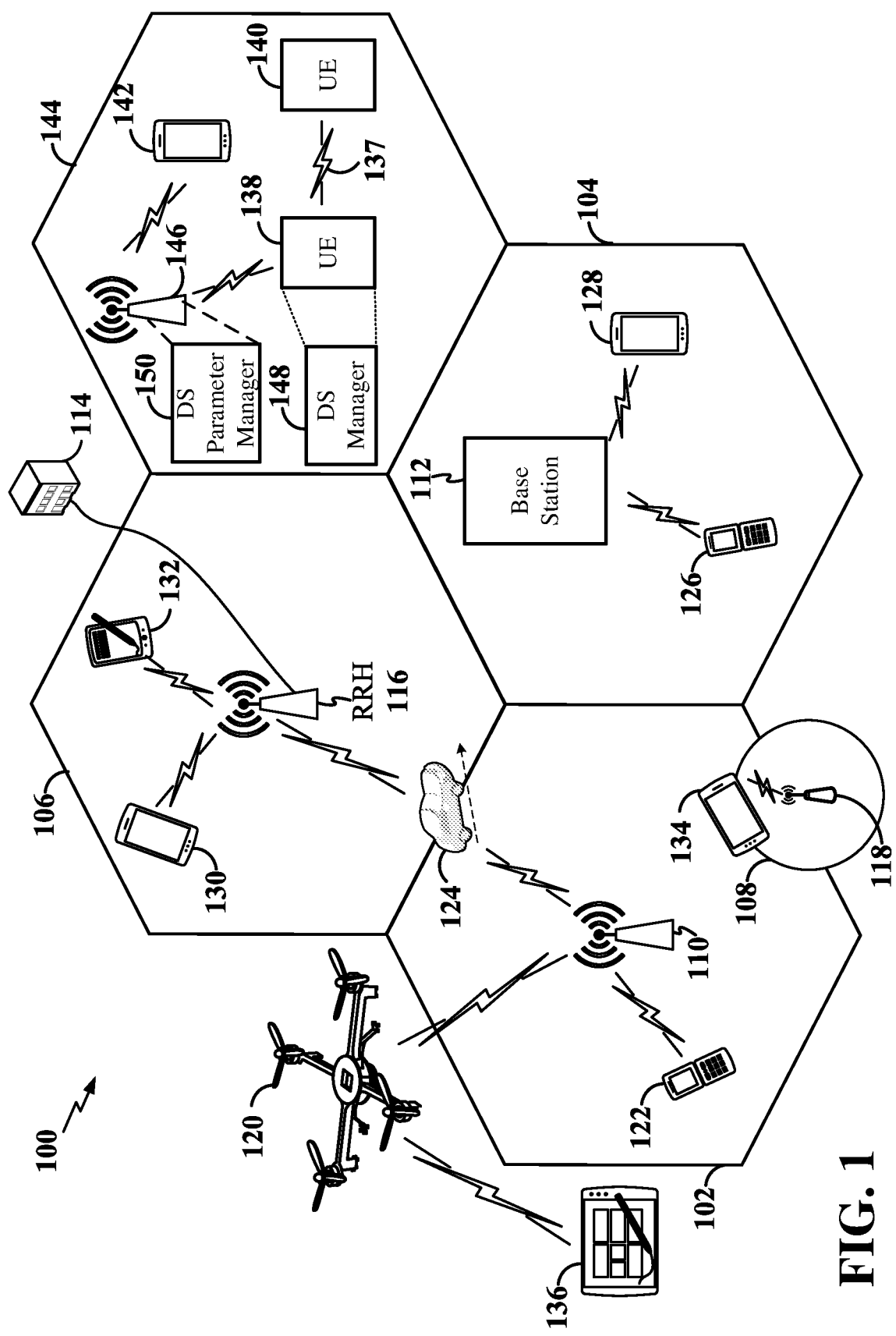
FIG. 1 is a conceptual illustration of an example of a radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to control of discovery signal transmissions for D2D communication. A first UE may transmit a discovery signal initiation message to at least a second UE to control transmission of a discovery signal from the second UE to a third UE. The second UE may identify a discovery signal monitoring duration of the second UE during which the second UE monitors for transmitted discovery signals transmitted from other UEs to the third UE. At expiration of the discovery signal monitoring duration, the second UE may transmit a discovery signal to the third UE when the number of transmitted discovery signals transmitted from the other UEs during the discovery signal monitoring duration is less than a discovery signal transmission number threshold.

In one example, the discovery signal control mechanism may be implemented within a wireless network to facilitate switching of a relay node relaying communication between a UE and a base station. However, it should be understood that the discovery signal control mechanism is not limited to relay node switching processes and may be utilized in other D2D discovery processes. In the relay node switching example, the first UE may be a source relay UE that operates as a relay node to relay communication between the third UE (e.g., a remote UE) and a base station. The source relay UE may initiate a relay node switch of the remote UE to the second UE (e.g., a neighbor relay UE) due to various factors, such as the movement of the first UE and/or third UE, channel variance, a battery status change, and/or a load status change.

To facilitate relay node switching, the source relay UE may transmit the discovery signal initiation message to one or more neighbor relay UEs. For example, the discovery signal initiation message may be broadcast or multicast to the neighbor relay UEs. The discovery signal initiation message initiates a respective discovery signal monitoring duration on each of the neighbor relay UEs. The respective discovery signal monitoring duration may be calculated on each of the neighbor relay UEs based on a discovery signal monitoring parameter. For example, the discovery signal monitoring parameter may include at least one probability distribution parameter associated with a probability distribution.

Each neighbor relay UE monitors the number of discovery signals transmitted by other neighbor relay UEs during their respective discovery signal monitoring duration. At expiration of the monitoring signal duration on a particular neighbor relay UE, the particular neighbor relay UE compares the number of transmitted discovery signals with the discovery signal transmission number threshold. When the number of transmitted discovery signals is less than the discovery signal transmission number threshold, the particular neighbor relay UE transmits a discovery signal to the remote UE. However, when the number of transmitted discovery signals is greater than or equal to the discovery signal transmission number threshold, the particular neighbor relay UE is precluded from transmitting the discovery signal and returns to a stand-by (non-relay) mode.

In some examples, the discovery signal monitoring parameter and discovery signal transmission number threshold are broadcast or multicast by the source relay UE to the neighbor relay UEs. In other examples, the discovery signal monitoring parameter and discovery signal transmission number threshold are broadcast, multicast, or unicast by the base station to the neighbor relay UEs. In still other examples, the discovery signal monitoring parameter and discovery signal transmission number threshold are hard-coded within the neighbor relay UEs.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, 144 and a small cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB) or some other suitable terminology.

In FIG. 1, three base stations 110, 112, and 146 are shown in cells 102, 104, and 144, respectively; and a third base station 114 is shown controlling a remote radio head (RRH) 116 in cell 106. That is, a base station can have an integrated antenna or can be connected to an antenna or RRH by feeder cables. In the illustrated example, the cells 102, 104, 106, and 144 may be referred to as macrocells, as the base stations 110, 112, 114, and 146 support cells having a large size. Further, a base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118, 146 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; UEs 138, 140, and 142 may be in communication with base station 146; and UE 136 may be in communication with mobile base station 120. Here, each base station 110, 112, 114, 118, 120, and 146 may be configured to provide an access point to a core network (not shown) for all the UEs in the respective cells. In another example, a mobile network node (e.g., quadcopter 120) may be configured to function as a UE. For example, the quadcopter 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or data (e.g., user data traffic or other type of traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

In the RAN 100, the ability for a UE to communicate while moving, independent of their location, is referred to as mobility. The various physical channels between the UE and the RAN are generally set up, maintained, and released under the control of an access and mobility management function (AMF), which may include a security context management function (SCMF) that manages the security context for both the control plane and the user plane functionality and a security anchor function (SEAF) that performs authentication. In various aspects of the disclosure, a RAN 100 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, 146, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, 132, 138, 140, and 142 may receive the unified synchronization signals, derive the carrier frequency and radio frame timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the RAN 100. Each of the cells may measure a strength of the pilot signal, and the RAN (e.g., one or more of the base stations 110 and 114/116 and/or a central node within the core network) may determine a serving cell for the UE 124. As the UE 124 moves through the RAN 100, the network may continue to monitor the uplink pilot signal transmitted by the UE 124. When the signal strength or quality of the pilot signal measured by a neighboring cell exceeds that of the signal strength or quality measured by the serving cell, the RAN 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

In order for transmissions over the RAN 100 to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

In early 5G NR specifications, data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

However, those of ordinary skill in the art will understand that aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In some examples, access to the air interface may be scheduled, wherein a scheduling entity (e.g., a base station) allocates resources (e.g., time—frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, two or more UEs (e.g., UEs 138 and 140) may communicate with each other using sidelink signals 137 without conveying that communication through a base station (e.g., base station 146) and without necessarily relying on scheduling or control information from a base station. In some examples, the UE 138 is functioning as a scheduling entity or an initiating (e.g., transmitting) sidelink device, and UE 140 may function as a scheduled entity or a receiving sidelink device. For example, the UE 138 may function as a scheduling entity in a device-to-device (D2D) system, peer-to-peer (P2P) system, vehicle-to-vehicle (V2V) network, a vehicle-to-everything (V2X) network, and/or in a mesh network.

For example, in D2D systems, two or more UEs (e.g., UEs 138 and 140) may communicate over a direct link with one other without traversing a base station (e.g., base station 146). For example, the UEs 138 and 140 may communicate using narrow directional beams over a mmWave carrier frequency. Here, D2D communication may refer to sidelink communication or relaying communication utilizing sidelink signals. In various aspects of the disclosure, a D2D relay framework may be included within a cellular network to facilitate relaying of communication to/from the base station 146 via D2D links (referred to herein as sidelinks 137). For example, one or more UEs (e.g., UE 138) within the coverage area of the base station 146 may operate as relaying UEs to extend the coverage of the base station 146, improve the transmission reliability to one or more UEs (e.g., UE 140), and/or to allow the base station to recover from a failed UE link due to, for example, blockage or fading.

To facilitate D2D communication between UEs 138 and 140 over the sidelink 137, UE 138 may include a discovery signal (DS) manager 148 configured to control transmission of a discovery signal to UE 140. In some examples, the discovery signal may include a synchronization signal, such as a primary synchronization signal (PSS) and/or a secondary synchronization signal (SSS) that facilitates device discovery and enables synchronization of communication on the sidelink 137. The discovery signal may be utilized by the UE 140 to measure the signal strength and channel status of a potential sidelink (e.g., sidelink 137) with another UE (e.g., UE 138). The UE 140 may utilize the measurement results to select a UE (e.g., UE 138) for sidelink communication or relay communication.

In some examples, the sidelink 137 between UE 138 and UE 140 may be established as part of a relay node switching process. For example, the UE 140 may have a relay connection to the base station 146 via another UE (e.g., UE 142). The UE 140 may then select UE 138 as a relay node switch target to switch relaying communication with the base station 146 from UE 142 to UE 138. Relay node switching may be performed, for example, due to one or more factors, such as movement of the UE 140 and/or UE 142, channel variance, a battery status change, and/or a load status change.

The DS manager 148 within UE 138 may be configured, for example, to receive a discovery signal initiation message from UE 142 to control transmission of a discovery signal from UE 138 to UE 140 based on a discovery signal monitoring duration of the UE 138. The discovery signal monitoring duration defines a period of time during which the UE 138 monitors for transmitted discovery signals transmitted from other UEs to the UE 140. In some examples, the discovery signal monitoring duration may be calculated from a discovery signal monitoring parameter that is hard-coded into the UE 138 or received from the UE 142 or the base station 146. For example, the discovery signal monitoring parameter may include at least one probability distribution parameter associated with a probability distribution.

At expiration of the discovery signal monitoring duration, the DS manager 148 enables the UE 138 to transmit a discovery signal to the UE 140 when the number of transmitted discovery signals transmitted from the other UEs during the discovery signal monitoring duration is less than a discovery signal transmission number threshold. The discovery signal transmission number threshold may be hard-coded into the UE 138 or received from the UE 142 or the base station 146.

In some examples, after establishing the sidelink 137 between UE 138 and UE 140 for relay communication, the DS manager 148 within the UE 138 may further be configured to facilitate a relay node switch from the UE 138 to another UE (e.g., UE 142). In this example, the DS manager 148 may be configured to transmit the discovery signal initiation message to one or more neighbor UEs (e.g., UE 142) to control transmission of a discovery signal from the neighbor UE(s) 142 to UE 140 for relay node switching from the UE 138 to, for example, the UE 142. The DS manager 148 may further be configured to transmit the discovery signal monitoring parameter to the one or more neighbor UE(s) 142 via, for example, broadcast or multicast signaling for use in calculating respective discovery signal monitoring durations on the neighbor UE(s) 142. In addition, the DS manager 148 may further be configured to transmit the discovery signal transmission number threshold to the one or more neighbor UE(s) 142 to allow transmission of the discovery signal from the neighbor UE 142 to the UE 140 when the number of transmitted discovery signal transmitted from other UEs to the UE 140 is less than the discovery signal transmission number threshold during the computed discovery signal monitoring duration of the neighbor UE 142.

In some examples, as shown in FIG. 1, the base station 146 may also include a DS parameter manager 150. In this example, the DS parameter manager 150 of the base station 146 may be configured to transmit at least one of the discovery signal monitoring parameter or the discovery signal transmission number threshold to one or more UEs (e.g., UEs 138 and 142). For example, the DS parameter manager 150 may be configured to broadcast, multicast, or unicast the discovery signal monitoring parameter and/or discovery signal transmission number threshold to the UEs 138 and 142.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
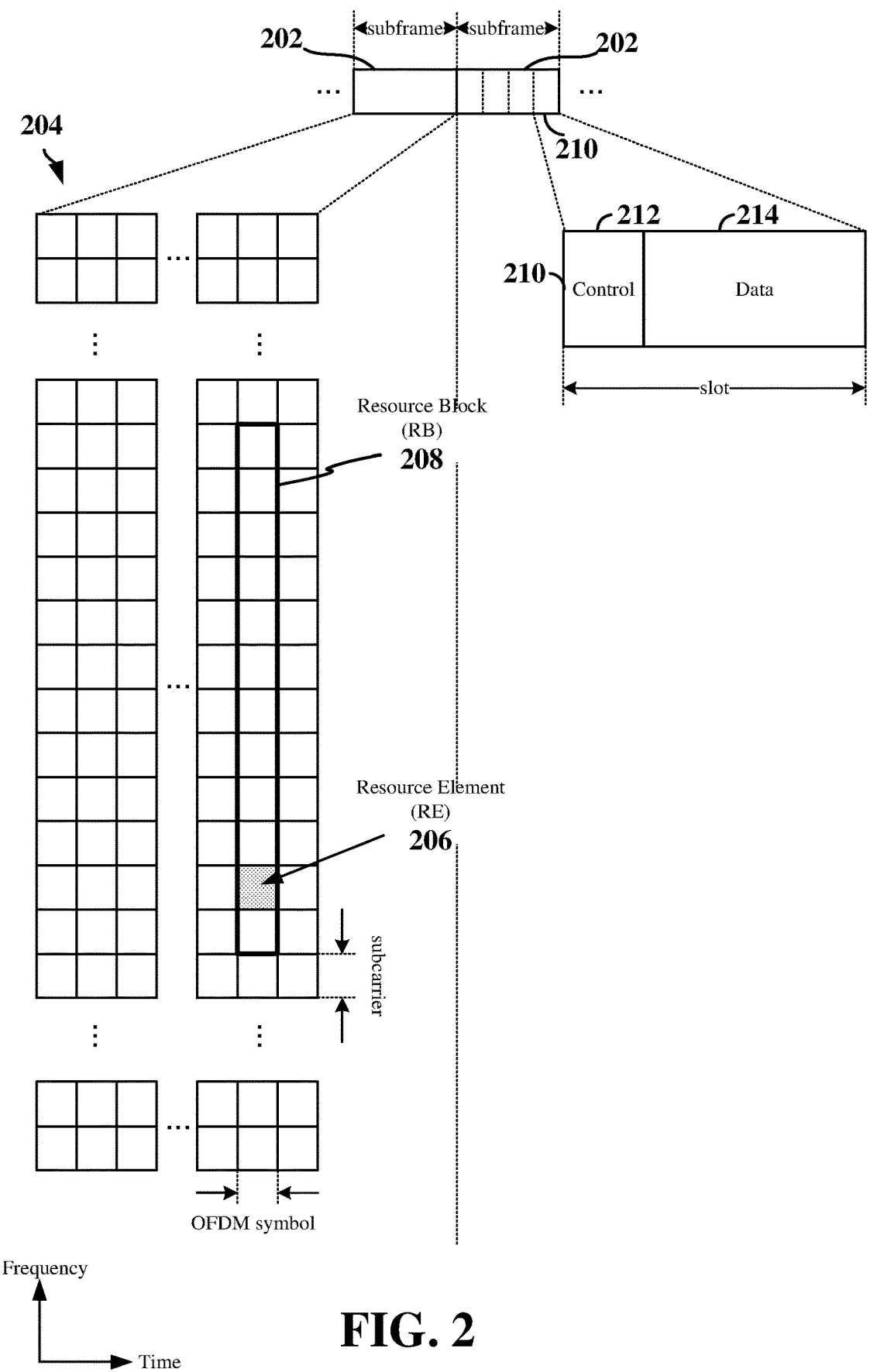
FIG. 2 is a diagram illustrating an example of a frame structure for use in a radio access network according to some aspects.

Referring now to FIG. 2, an expanded view of an exemplary DL subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 204 may be used to schematically represent time—frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time—frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 208 entirely corresponds to a single direction of communication (either transmission or reception for a given device).

Scheduling of UEs (e.g., scheduled entities) for downlink, uplink, or sidelink transmissions typically involves scheduling one or more resource elements 206 within one or more sub-bands. Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station or may be self-scheduled by a UE implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast or unicast communication. For example, a broadcast or multicast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In a DL transmission, the transmitting device may allocate one or more REs 206 (e.g., within a control region 212) to carry DL control information including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device may utilize one or more REs 206 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 206 (e.g., within the data region 214) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry system information blocks (SIBs), carrying information that may enable access to a given cell.

In an example of sidelink communication, the control region 212 of the slot 210 may include a physical sidelink control channel (PSCCH) including downlink control information (DCI) transmitted by a UE (e.g., D2D device) towards a set of one or more other UEs (e.g., other D2D devices). In some examples, the DCI may include synchronization information to synchronize communication between sidelink devices on the sidelink channel. In addition, the DCI may include scheduling information indicating one or more resource blocks within the data region 214 reserved by an initiating (or transmitting) sidelink device (e.g., the "scheduling entity") for sidelink communication. The data region 214 of the slot 210 may include a physical sidelink shared channel (PSSCH) including the data transmitted by the initiating sidelink device within the reserved resources over the sidelink channel.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1 and 2 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 3:
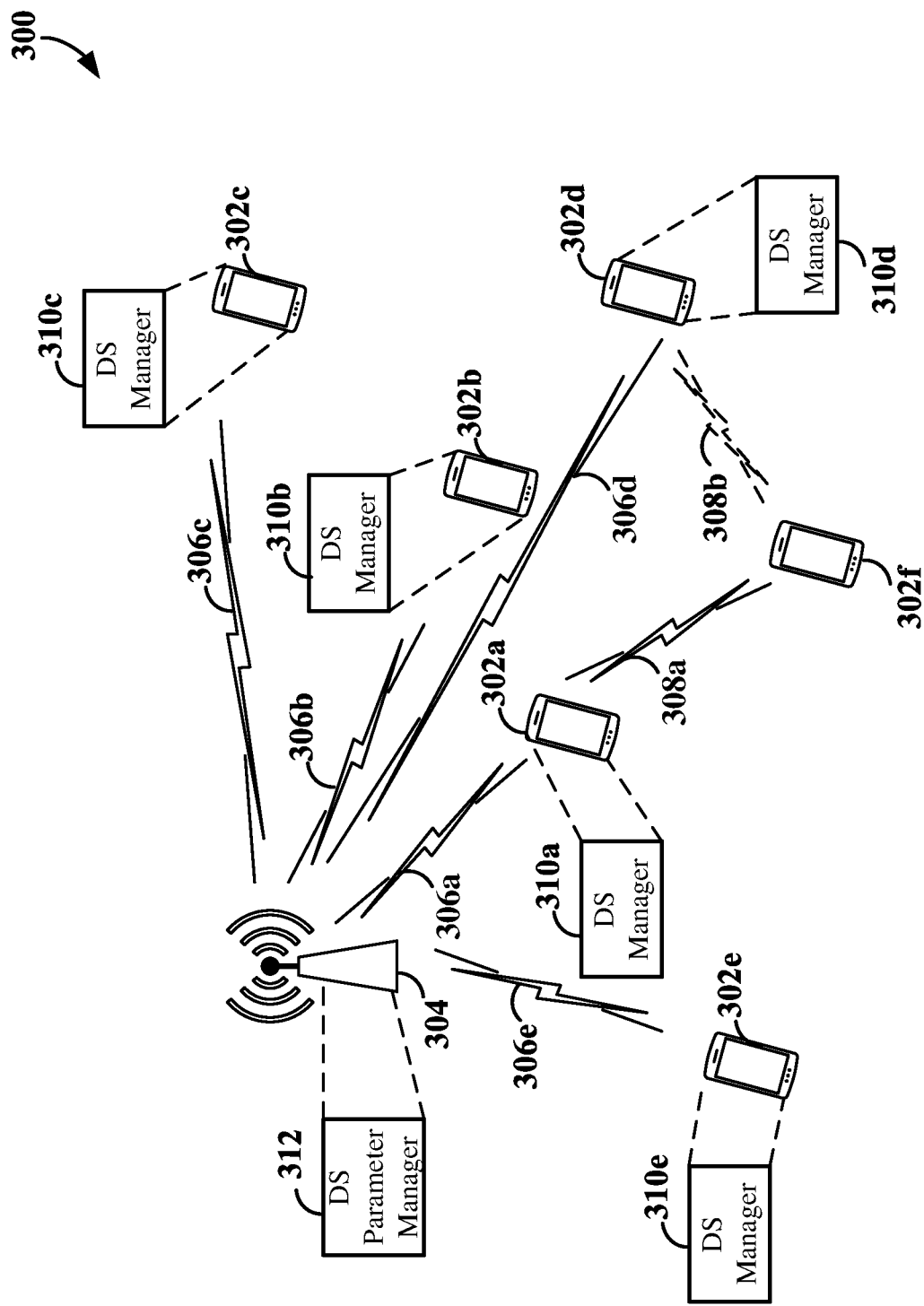
FIG. 3 is a diagram illustrating an exemplary wireless network employing D2D relaying according to some aspects.

FIG. 3 is a diagram illustrating an exemplary wireless network 300 employing D2D relaying. The wireless network 300 may correspond, for example, to the RAN 100 illustrated in FIG. 1. The wireless network 300 may include a fifth generation base station (e.g., a gNB) 304 in wireless communication one or more UEs 302a, 302b, 302c, 302d, and 302e. In the example shown in FIG. 3, the base station 304 may communicate with each of the UEs 302a, 302b, 302c, 302d, and 302e via a respective wireless communication link 306a, 306b, 306c, 306d, and 306e. Each of the wireless communication links 306a, 306b, 306c, 306d, and 306e may utilize a sub-6 GHz carrier frequency or a mmWave carrier frequency.

In addition, a D2D relay link (sidelink) 308a may be established between UE 302a and another UE 302f to enable relaying of information between the base station 304 and the UE 302f. In this example, the relay link (sidelink) 308a may be established between the UE 302a and UE 302f due to distance or signal blocking between the base station 304 and UE 302f, weak receiving capability of the UE 302f, low transmission power of the UE 302f, and/or limited battery capacity of UE 302f. The relay link 308a between UEs 302a and 302f may enable communication between the base station 304 and UE 302f to be relayed via UE 302a over wireless communication link (e.g., the Uu interface) 306a and relay link (e.g., sidelink) 308a.

In the example shown in FIG. 3, the UE 302a may be referred to as a source relay UE, UEs 302b-302e may be referred to as neighbor relay UEs, and the UE 302f may be referred to as a remote UE. When the source relay UE 302a initiates a relay node switch of the remote UE 302f from the source relay UE 302a to one of the neighbor relay UEs 302b-302e (e.g., due to movement of UE 302a or 302f, channel variance of the channel between UE 302a and 302f, a battery status change of UE 302a or 302f, and/or a load status change associated with UE 302a), the source relay UE 302a may instruct the remote UE 302f to perform the relay node switch.

In some examples, the remote UE 302f may perform the relay node switch operation without assistance from the source relay UE 302a. For example, the remote UE 302f may detect one or more neighbor relay UEs 302b-302e, awaken the one or more of the neighbor relay UEs 302b-302e, and receive and process discovery signals from the one or more neighbor relay UEs 302b-302e. In this example, a large amount of signaling and processing is involved in performing the relay node switch operation, which may impact the battery life of the remote UE 302f. Moreover, if the device bandwidth of the remote UE 302f is smaller than the device bandwidth of one or more of the neighbor UEs 302b-302e, the remote UE 302f may perform inter-frequency measurements, which may result in data transfer interruptions.

In some examples, the source relay UE 302a may assist the remote UE 302f in discovering and activating neighbor relay UEs 302b-302e for relay node switching. For example, the source relay UE 302a may monitor a scope of possible frequency spectrums to identify the device bandwidth of each of the neighbor relay UEs 302b-302e, exchange messages with each of the neighbor relay UEs 302b-302e to determine the availability of each of the neighbor relay UEs 302b-302e to relay to the remote UE 302f, and then indicate to the available neighbor relay UEs 302b-302e to transmit a discovery signal to the remote UE 302f. In this example, when there are a large number of neighbor relay UEs 302b-302e, individually communicating with each neighbor relay UE 302b-302e may increase the latency in completing the relay node switch process and may further result in high power consumption at the source relay UE 302a. In addition, the mutual interference among the discovery signals increases as the number of neighbor relay UEs 302b-302e increases.

In various aspects of the disclosure, to reduce the latency in performing relay node switching, reduce the mutual interference among transmitted discovery signals, and minimize power consumption in the source relay UE 302a and remote UE 302f, a limited number of neighbor relay UEs 302b-302e may be activated to transmit discovery signals to the remote UE 302f. To control the activation of neighbor relay UEs 302b-302e to transmit discovery signals to the remote UE 302f, the source relay UE 302a and neighbor relay UEs 302b-302e may each include a respective discovery signal (DS) manager 310a-310e. Each DS manager 310a-310e may correspond, for example, to the DS manager 148 shown in FIG. 1.

In some examples, the source relay UE 302a may activate the neighbor relay UEs 302b-302e to transmit respective discovery signals. For example, the DS manager 310a within the source relay UE 302a may be configured to generate and transmit a discovery signal initiation message to the neighbor relay UEs 302b-302e. In one example, the source relay UE 302a may broadcast the discovery signal initiation message to the neighbor relay UEs 302a-302e. In another example, the source relay UE 302a may multicast the discovery signal initiation message to the neighbor relay UEs 302a-302e. By broadcasting or multicasting the discovery signal initiation message, the power consumption on the source relay UE 302a and neighbor relay UEs 302b-302e may be reduced.

Upon receiving the discovery signal initiation message, the respective DS managers 310b-310e within the neighbor relay UEs 302b-302e may initiate discovery signal monitoring for respective discovery signal monitoring durations. Each discovery signal monitoring duration may include at least one of a number of slots, a duration of time (e.g., a number of mini-seconds), or a number of discovery signal resources (e.g., time—frequency resources or code-division sequences) via which discovery signals are transmitted. For example, the discovery signal monitoring duration may indicate a number of discovery signal occasions, where each discovery signal occasion corresponds to a particular discovery signal resource (e.g., a time—frequency resource of a code-division sequence) that may be utilized or has been allocated for the transmission of discovery signals via D2D (sidelink) communication. In some examples, the discovery signal monitoring durations differ between the neighbor relay UEs 302b-302e to alleviate or eliminate interference among transmitted discovery signals.

In some examples, the discovery signal monitoring duration on a particular neighbor relay UE (e.g., neighbor relay UE 302b) may be calculated based on a discovery signal monitoring parameter hard-coded in the neighbor relay UE 302b or received from the source relay UE 302a or the base station 304. For example, the DS manager 310a within the source relay UE 302a may further be configured to generate and transmit the discovery signal monitoring parameter to the neighbor relay UEs 302b-302e. Each neighbor relay UE 302b-302e may receive the discovery signal monitoring parameter from the source relay UE 302a via a broadcast signal or a multicast signal. In some examples, the discovery signal monitoring parameter may be transmitted substantially concurrently with the discovery signal initiation message in the same or different broadcast or multicast resources. For example, the discovery signal monitoring parameter and the discovery signal initiation message may be transmitted within the same time—frequency resources, slot, or mini-slot.

As another example, the base station 304 may be configured to transmit the discovery signal monitoring parameter to the neighbor relay UEs 302b-302e. In this example, the base station 304 includes a DS parameter manager 312, which may correspond, for example, to the DS parameter manager 150 shown in FIG. 1. The DS parameter manager 312 may be configured to broadcast the discovery signal monitoring parameter to the neighbor relay UEs 302b-302e, multicast the discovery signal monitoring parameter to the neighbor relay UEs 302b-302e, or transmit the discovery signal monitoring parameter to the neighbor relay UEs 302b-302e via respective unicast signals. For example, the DS parameter manager 312 within the base station 304 may include the discovery signal monitoring parameter within radio resource control (RRC) signaling, a medium access control—control element (MAC-CE), or downlink control information (DCI).

In some examples, the discovery signal monitoring parameter includes at least one probability distribution parameter associated with a probability distribution. The DS managers 310b-310e within each of the neighbor relay UEs 302b-302e may each be configured to generate a respective random value that satisfies the probability distribution based on the at least one probability distribution factor. The DS managers 310b-310e may each be then configured to set the respective discovery signal monitoring duration to the respective random value. For example, the at least one probability distribution parameter may include a Poisson distribution factor of a Poisson distribution. The DS managers 310b-310e within each of the neighbor relay UEs 302b-302e may each be configured to randomly generate a respective random value based on the Poisson distribution factor, and set the respective discovery signal monitoring duration to the respectively generated random value.

As another example, the at least one probability distribution factor may include a maximum value and a minimum value of an even probability distribution. In some examples, the DS managers 310b-310e within each of the neighbor relay UEs 302b-302e may each be configured to randomly select a respective random value between the maximum and minimum values and set the respective discovery signal monitoring duration to the respectively selected random value. In some examples, the DS managers 310b-310e within each of the neighbor relay UEs 302b-302e may each be configured to calculate the respective discovery signal monitoring duration based on an identifier of the respective neighbor relay UE 302b-302e and the maximum and minimum values of the even probability distribution. For example, each DS manager 310b-310e may be configured to calculate the respective discovery signal monitoring duration as follows:

$$DSMonitor_{duration}=UEID \; mod(MaxVal-MinVal)+MinVal, \quad \text{(Equation 1)}$$

where the UEID is the unique identifier of the neighbor relay UE, MaxVal is the maximum value of the even probability distribution, MinVal is the minimum value of the even probability distribution, and mod refers to the module operation.

During the respective discovery signal monitoring duration on each of the neighbor relay UEs 302b-302e, the respective DS managers 310b-310e may monitor the number of transmitted discovery signals transmitted by other neighbor relay UEs to the remote UE 302f. The respective DS managers 310b-310e may then generate and transmit a respective discovery signal to the remote UE 302f at the end of the respective discovery signal monitoring durations when the number of transmitted discovery signals is less than a discovery signal transmission number threshold. In some examples, the discovery signal transmission number threshold is a positive integer, such as one, two, three, etc.

For example, the DS manager 310b of neighbor relay UE 302b may count the number of transmitted discovery signals transmitted by other neighbor relay UEs 302c-302e over the discovery signal monitoring duration of the neighbor relay UE 302b. Upon expiration of the discovery signal monitoring duration of neighbor relay UE 302b, the DS manager 310b may then compare the counted number of transmitted discovery signals to the discovery signal transmission number threshold. When the number of transmitted discovery signals transmitted from other neighbor relay UEs is less than the discovery signal transmission number threshold, the DS manager 310b may generate and transmit a discovery signal to the remote UE 302f. However, if the number of transmitted discovery signals is greater than or equal to the discovery signal transmission number threshold, the DS manager 310b of neighbor relay UE 302b is precluded from transmitting the discovery signal to the remote UE 302f and returns to a stand-by (non-relay) mode. As a result, the number of neighbor relay UEs 302b-302e transmitting discovery signals to the remote UE 302f may be limited, thus saving power on the remote UE 302f and the neighbor relay UEs 302b-302e as a whole, while further reducing mutual interference between transmitted discovery signals.

In some examples, the discovery signal transmission number threshold may be hard-coded in each neighbor relay UE 302b-302e or received from the source relay UE 302a or the base station 304. For example, the DS manager 310a within the source relay UE 302a may further be configured to generate and transmit the discovery signal transmission number threshold to the neighbor relay UEs 302b-302e. In this example, each neighbor relay UE 302b-302e may receive the discovery signal transmission number threshold from the source relay UE 302a via a broadcast signal or a multicast signal. In some examples, the discovery signal transmission number threshold may be transmitted substantially concurrently with one or more of the discovery signal monitoring parameter or the discovery signal initiation message in the same or different broadcast or multicast resources (e.g., within the same time—frequency resources, the same slot, or the same mini-slot).

As another example, the base station 304 may be configured to transmit the discovery signal transmission number threshold to the neighbor relay UEs 302b-302e. In this example, the DS parameter manager 312 of the base station 304 may be configured to broadcast the discovery signal transmission number threshold to the neighbor relay UEs 302b-302e, multicast the discovery signal transmission number threshold to the neighbor relay UEs 302b-302e, or transmit the discovery signal transmission number threshold to the neighbor relay UEs 302b-302e via respective unicast signals. For example, the DS parameter manager 312 within the base station 304 may include the discovery signal transmission number threshold within RRC signaling, a MAC-CE, or DCI. In some examples, the DS parameter manager 312 may transmit the discovery signal transmission number threshold substantially concurrently with the discovery signal monitoring parameter in the same or different resources (e.g., within the same time—frequency resources, the same slot, or the same mini-slot).

In some examples, the discovery signal monitoring parameter may be determined by the DS manager 310a or the DS parameter manager 312 based on a latency requirement associated with performing the relay node switch of the remote UE 312f from the source relay UE 302a to another neighbor relay UE 302b-302e. In examples in which the latency requirement is small (e.g., there is minimal time to complete the relay node switch), the DS manager 310a or DS parameter manager 312 may select a small maximum value for an even probability distribution or a large Poisson distribution factor to result in a shorter discovery signal monitoring duration on each of the neighbor relay UEs 302b-302e. In addition, the discovery signal transmission number threshold may be determined by the DS manager 310a or the DS parameter manager 312 based on the latency requirement associated with performing the relay node switch or a number of candidate UEs (e.g., other remote UEs, not shown) to be relay node switched from the source relay UE 302a to another neighbor relay UE 302b-302e. In examples in which the latency requirement is small or there are a large number of candidate UEs to be relay node switched, the DS manager 310a or the DS parameter manager 312 may select a higher discovery signal transmission number threshold to increase the number of discovery signals transmitted to the remote UE 310f.

The remote UE 302f may then receive one or more discovery signals from one or more respective neighbor relay UEs 302b-302f and select one of the neighbor relay UEs (e.g., neighbor relay UE 302d) as a relay node switch target to switch relaying communication with the base station 304. To establish a new relay link (sidelink) 308*b* with the target neighbor relay UE 302*d*, the remote UE 302*f* may initiate a random access procedure with the target neighbor relay UE 302*d*. In an exemplary random access procedure, the remote UE 302*f* may randomly select a preamble from an available set of preambles within a cell associated with the target neighbor relay UE 302*d*, and transmit the selected preamble to the target neighbor relay UE 302*d* in a random access channel (RACH) preamble message. Upon receipt of the RACH preamble message, the target neighbor relay UE 302*d* may then transmit a random access response (RAR) message to the remote UE 302*f* to establish the new relay link 308*b* between the target neighbor relay UE 302*d* and the remote UE 302*f*.

Figure 4:
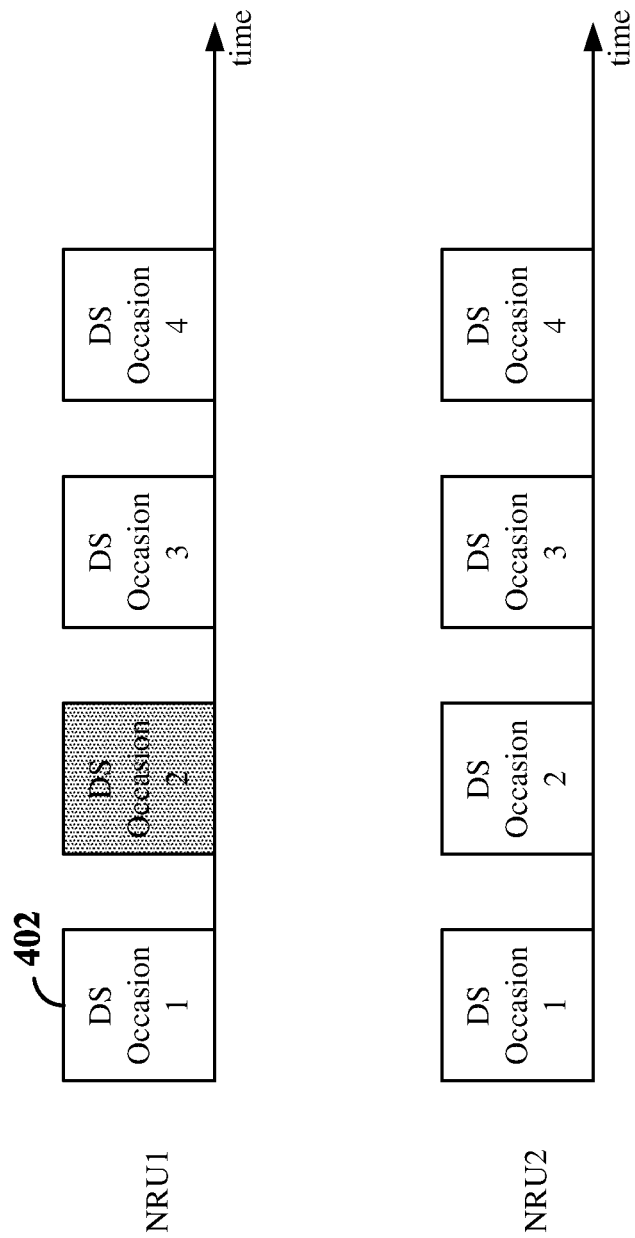
FIG. 4 is a diagram illustrating an exemplary implementation of discovery signal transmission control according to some aspects.

FIG. 4 is a diagram illustrating an exemplary implementation of controlling the transmission of discovery signals by neighbor relay UEs (NRUs) to a remote UE. In the example shown in FIG. 4, two NRUs (NRU1 and NRU2) are illustrated. The discovery signal monitoring durations on each of the NRUs are defined in terms of discovery signal (DS) occasions (e.g., time—frequency resources or code-division sequences on which discovery signals may be transmitted). The calculated discovery signal monitoring duration for NRU1 is one DS occasion, whereas the calculated discovery signal monitoring duration for NRU2 is three DS occasions. In the example shown in FIG. 4, the discovery signal transmission number threshold is equal to one.

Each NRU (NRU1 and NRU2) initiates their respective discovery signal monitoring duration at the beginning of the first DS occasion (e.g., DS Occasion 1). The discovery signal monitoring duration for NRU1 expires at the end of DS Occasion 1. Since no discovery signals were transmitted during DS Occasion 1, NRU1 transmits a discovery signal at DS Occasion 2. NRU2 detects the transmission of the discovery signal by NRU1 at DS Occasion 2. Since the discovery signal transmission number threshold is one, the number of transmitted discovery signals (e.g., one discovery signal transmitted by NRU1) is not less than the discovery signal transmission number threshold. Therefore, NRU2 does not transmit a discovery signal at the expiration of the discovery signal monitoring duration of NRU2. In some examples, NRU2 may return to stand-by (non-relay) mode upon detecting the discovery signal transmission from NRU1. In other examples, NRU2 may return to stand-by (non-relay) mode at the end of DS Occasion 3 (e.g., at the end of the discovery signal monitoring duration of NRU2).

Figure 5:
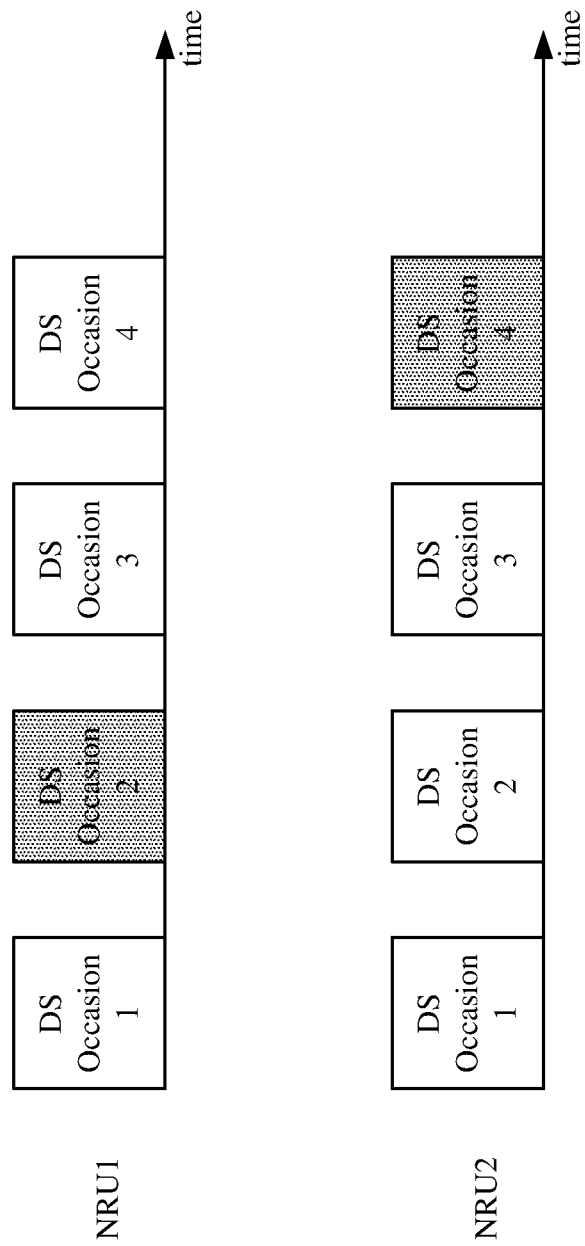
FIG. 5 is a diagram illustrating another exemplary implementation of discovery signal transmission control according to some aspects.

FIG. 5 is a diagram illustrating another exemplary implementation of discovery signal transmission control according to some aspects. In the example shown in FIG. 5, two NRUs (NRU1 and NRU2) are again illustrated. The calculated discovery signal monitoring duration for NRU1 is one DS occasion, whereas the calculated discovery signal monitoring duration for NRU2 is three DS occasions. In the example shown in FIG. 5, the discovery signal transmission number threshold is equal to two.

Each NRU (NRU1 and NRU2) initiates their respective discovery signal monitoring duration at the beginning of the first DS occasion (e.g., DS Occasion 1). The discovery signal monitoring duration for NRU1 expires at the end of DS Occasion 1. Since no discovery signals were transmitted during DS Occasion 1, NRU1 transmits a discovery signal at DS Occasion 2. NRU2 detects the transmission of the discovery signal by NRU1 at DS Occasion 2. The discovery signal monitoring duration for NRU2 expires at the end of DS Occasion 3. Since the discovery signal transmission number threshold is two, the number of transmitted discovery signals (e.g., one discovery signal transmitted by NRU1) is less than the discovery signal transmission number threshold. Therefore, NRU2 transmits a discovery signal at DS Occasion 4.

Figure 6:
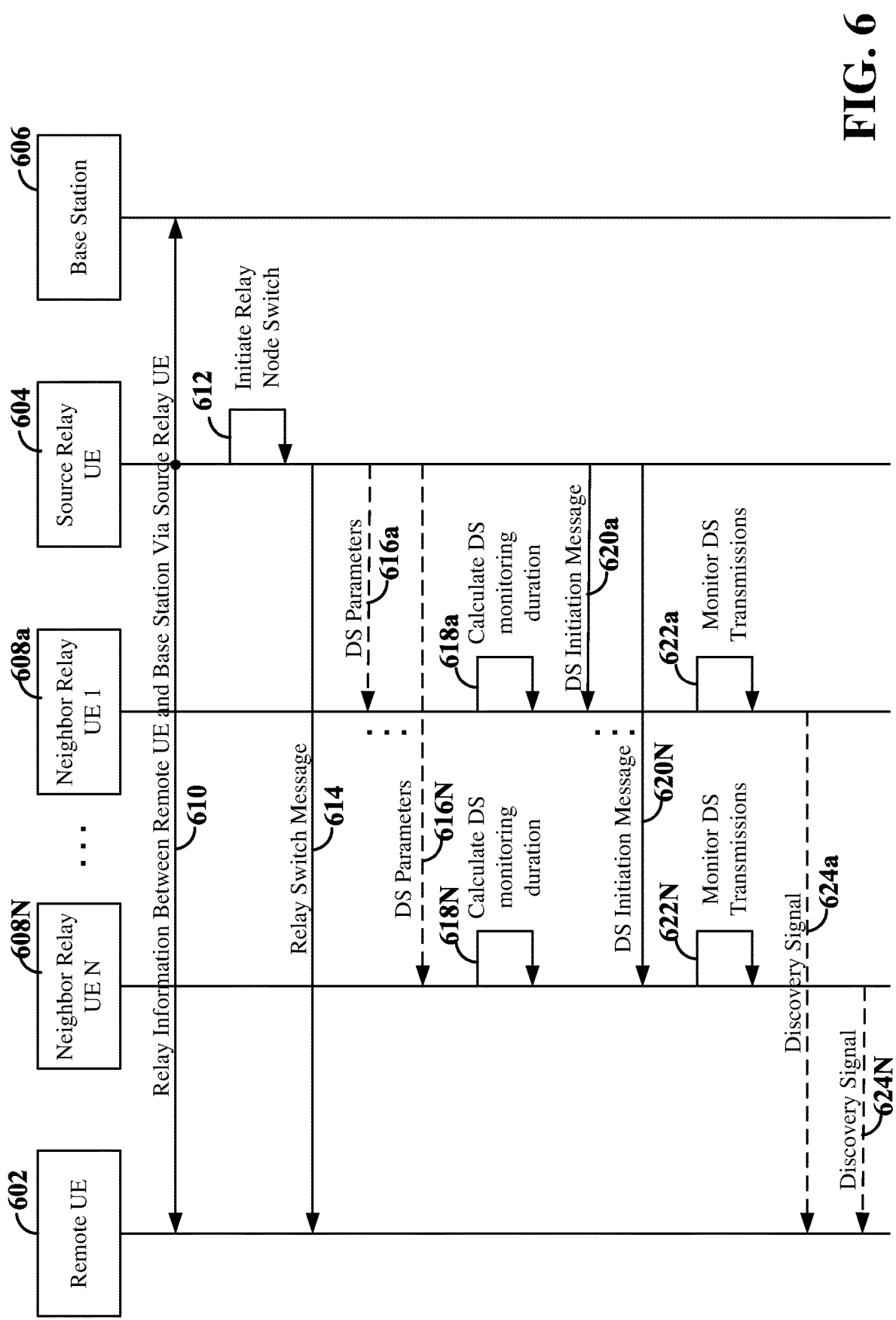
FIG. 6 is a signaling diagram illustrating exemplary signaling to facilitate relay node switching according to some aspects.

FIG. 6 is a signaling diagram illustrating exemplary signaling to facilitate relay node switching from a source relay UE 604 to a target neighbor relay UE of a plurality of neighbor relay UEs 608*a* . . . 608N to relay communication between a remote UE 602 and a base station 606. The source relay UE 604 may correspond, for example, to the source relay UE 302*a* shown in FIG. 3 and/or the UE 138 shown in FIG. 1. The neighbor relay UEs 608*a* . . . 608N may correspond, for example, to the neighbor relay UEs 302*b*-302*e* shown in FIG. 3 and/or the UE 142 shown in FIG. 1. The remote UE 602 may correspond, for example, to the remote UE 302*f* shown in FIG. 3 and/or the UE 140 shown in FIG. 1. The base station 606 may correspond, for example, to the base station 304 shown in FIG. 3 and/or the base station 146 shown in FIG. 1.

At 610, a relay link (sidelink) is established between the remote UE 602 and the source relay UE 604 to relay information between the remote UE 602 and the base station 606 via the source relay UE 604. For example, the remote UE 602 may transmit information to and/or receive information from the base station 606 via the relay link and a Uu link between the source relay UE 604 and the base station 606.

At 612, the source relay UE 604 may initiate a relay node switch. For example, the source relay UE 604 may initiate a relay node switch due to movement of the remote UE 602 or source relay UE 604, channel variance of the channel between the remote UE 602 and the source relay UE 604, a battery status change of the remote UE 602 or source relay UE 604, and/or a load status change associated with the source relay UE 604. In some examples, the remote UE 602 may request the relay node switch. Upon initiating a relay node switch, at 614, the source relay UE 604 may transmit a relay node switch message to the remote UE 602 instructing the remote UE 602 to perform a relay node switch.

At 616*a* . . . 616N, the source relay UE 604 may generate and transmit discovery signal (DS) parameters to the neighbor relay UEs 608*a* . . . 608N. The DS parameters may include, for example, at least one of a discovery signal monitoring parameter or a discovery signal transmission number threshold. In an example, the source relay UE 604 may broadcast or multicast the DS parameters to the neighbor relay UEs 608*a* . . . 608N. In some examples, the source relay UE may transmit the DS parameters prior to initiating the relay node switch. In some examples, one or more of the DS parameters are hard-coded into the neighbor relay UEs 608*a* . . . 608N. In some examples, the discovery signal monitoring parameter may be determined by the source relay UE 604 based on a latency requirement associated with performing the relay node switch from the source relay UE 604 to a neighbor relay UE 608*a* . . . 608N. In addition, the discovery signal transmission number threshold may be determined by the source relay UE 604 based on the latency requirement associated with performing the relay node switch or a number of candidate UEs (e.g., other remote UEs, not shown) to be relay node switched from the source relay UE 604 to a neighbor relay UE 608*a* . . . 608N.

At 618*a* . . . 618N, the neighbor relay UEs 608*a* . . . 608N may each calculate a respective DS monitoring duration based on the DS parameters. The discovery signal monitoring duration may include, for example, a number of slots, a duration of time, or a number of discovery signal resources (e.g., DS occasions) via which discovery signals are transmitted. For example, each neighbor relay UE 608*a* . . . 608N may calculate the respective DS monitoring duration based on at least the discovery signal monitoring parameter. Here, the discovery signal monitoring parameter may include at least one probability distribution parameter associated with a probability distribution. For example, the at least one probability distribution parameter may include maximum and minimum values of an even probability distribution or a Poisson distribution factor of a Poisson distribution. In some examples, one or more of the neighbor relay UEs 608*a* . . . 608N may calculate their respective discovery signal monitoring duration based further on an identifier of the respective neighbor relay UE.

At 620*a* . . . 620N, the source relay UE 604 may generate and transmit a DS initiation message to initiate discovery signal monitoring on the neighbor relay UEs 608*a* . . . 608N for the respective discovery signal monitoring durations of the neighbor relay UEs 608*a* . . . 608N. In some examples, the source relay UE 604 may broadcast or multicast the DS initiation message to the neighbor relay UEs 608*a* . . . 608N. In some examples, the source relay UE 604 may transmit the DS parameters concurrently with the DS initiation message.

At 622*a* . . . 622N, each of the neighbor relay UEs 608*a* . . . 608N may monitor DS transmissions by other neighbor relay UEs 608*a* . . . 608N. For example, each neighbor relay UE 608*a* . . . 608N may count the number of discovery signals transmitted from other neighbor relay UEs to the remote UE 602 during their respective discovery signal duration. Upon expiration of their respective discovery signal duration, each neighbor relay UE 608*a* . . . 608N may determine whether the number of transmitted discovery signals transmitted from other neighbor relay UEs to the remote UE 602 is less than the discovery signal transmission number threshold. When the number of transmitted discovery signals counted by one or more of the neighbor relay UEs 608*a* . . . 608N during their respective discovery signal monitoring durations is less than the discovery signal transmission number threshold, at 624*a* . . . 624N, those one or more neighbor relay UEs 608*a* . . . 608N each transmit a respective discovery signal to the remote UE 602.

Figure 7:
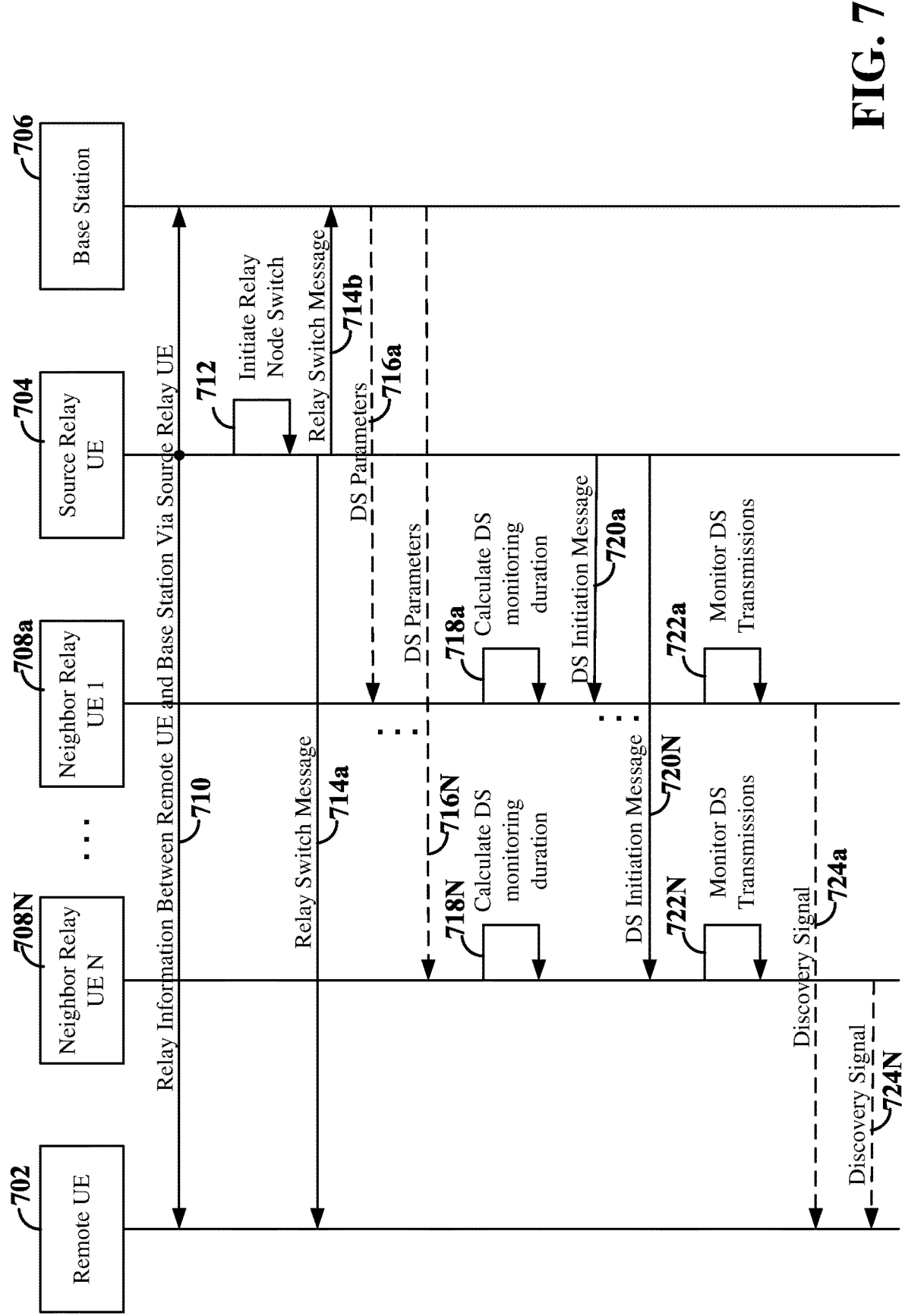
FIG. 7 is a signaling diagram illustrating other exemplary signaling to facilitate relay node switching according to some aspects.

FIG. 7 is a signaling diagram illustrating other exemplary signaling to facilitate relay node switching from a source relay UE 604 to a target neighbor relay UE of a plurality of neighbor relay UEs 708*a* . . . 708N to relay communication between a remote UE 702 and a base station 706. The source relay UE 704 may correspond, for example, to the source relay 604 shown in FIG. 6, the source relay UE 302*a* shown in FIG. 3, the UE 138 shown in FIG. 1. The neighbor relay UEs 708*a* . . . 708N may correspond, for example, to the neighbor relay UEs 608 . . . 608N shown in FIG. 6, the neighbor relay UEs 302*b*-302*e* shown in FIG. 3 and/or the UE 142 shown in FIG. 1. The remote UE 702 may correspond, for example, to the remote UE 602 shown in FIG. 6, the remote UE 302*f* shown in FIG. 3 and/or the UE 140 shown in FIG. 1. The base station 706 may correspond, for example, to the base station 606 shown in FIG. 6, the base station 304 shown in FIG. 3 and/or the base station 146 shown in FIG. 1.

At 710, a relay link (sidelink) is established between the remote UE 702 and the source relay UE 704 to relay information between the remote UE 702 and the base station 706 via the source relay UE 704. For example, the remote UE 702 may transmit information to and/or receive information from the base station 706 via the relay link and a Uu link between the source relay UE 704 and the base station 706.

At 712, the source relay UE 704 may initiate a relay node switch. For example, the source relay UE 704 may initiate a relay node switch due to movement of the remote UE 702 or source relay UE 704, channel variance of the channel between the remote UE 702 and the source relay UE 704, a battery status change of the remote UE 702 or source relay UE 704, and/or a load status change associated with the source relay UE 704. In some examples, the remote UE 702 may request the relay node switch. Upon initiating a relay node switch, at 714*a*, the source relay UE 704 may transmit a relay node switch message to the remote UE 702 instructing the remote UE 702 to perform a relay node switch. In addition, at 714*b*, the source relay UE 704 may generate and transmit a relay node switch message to the base station 706 informing the base station that the remote UE 702 is performing a relay node switch. The relay node switch message transmitted to the base station 706 may further indicate a latency requirement associated with performing the relay node switch. For example, the latency requirement may indicate a duration of time within which the relay node switch should be completed based on, for example, one or more of the factors utilized in determining to initiate the relay node switch.

At 716*a* . . . 716N, the base station 706 may generate and transmit discovery signal (DS) parameters to the neighbor relay UEs 708*a* . . . 708N. The DS parameters may include, for example, at least one of a discovery signal monitoring parameter or a discovery signal transmission number threshold. In an example, the base station 706 may broadcast, multicast, or unicast the DS parameters to the neighbor relay UEs 708*a* . . . 708N. In some examples, the base station 706 may transmit the DS parameters prior to receiving the indication of the relay node switch. In some examples, one or more of the DS parameters are hard-coded into the neighbor relay UEs 708*a* . . . 708N. In some examples, the discovery signal monitoring parameter may be determined by the base station 706 based on a latency requirement associated with performing the relay node switch from the source relay UE 704 to a neighbor relay UE 708*a* . . . 708N. In addition, the discovery signal transmission number threshold may be determined by the base station 706 based on the latency requirement associated with performing the relay node switch or a number of candidate UEs (e.g., other remote UEs, not shown) to be relay node switched from the source relay UE 704 to a neighbor relay UE 708*a* . . . 708N.

At 718*a* . . . 718N, the neighbor relay UEs 708*a* . . . 708N may each calculate a respective DS monitoring duration based on the DS parameters. The discovery signal monitoring duration may include, for example, a number of slots, a duration of time, or a number of discovery signal resources (e.g., DS occasions) via which discovery signals are transmitted. For example, each neighbor relay UE 708*a* . . . 708N may calculate the respective DS monitoring duration based on at least the discovery signal monitoring parameter. Here, the discovery signal monitoring parameter may include at least one probability distribution parameter associated with a probability distribution. For example, the at least one probability distribution parameter may include maximum and minimum values of an even probability distribution or a Poisson distribution factor of a Poisson distribution. In some examples, one or more of the neighbor relay UEs 708*a* . . . 708N may calculate their respective discovery signal monitoring duration based further on an identifier of the respective neighbor relay UE.

At 720*a* . . . 720N, the source relay UE 704 may generate and transmit a DS initiation message to initiate discovery signal monitoring on the neighbor relay UEs 708*a* . . . 708N for the respective discovery signal monitoring durations of the neighbor relay UEs 708a . . . 708N. In some examples, the source relay UE 704 may broadcast or multicast the DS initiation message to the neighbor relay UEs 708a . . . 708N. In some examples, the source relay UE 704 may transmit the DS parameters concurrently with the DS initiation message.

At 722a . . . 722N, each of the neighbor relay UEs 708a . . . 708N may monitor DS transmissions by other neighbor relay UEs 708a . . . 708N. For example, each neighbor relay UE 708a . . . 708N may count the number of discovery signals transmitted from other neighbor relay UEs to the remote UE 702 during their respective discovery signal duration. Upon expiration of their respective discovery signal duration, each neighbor relay UE 708a . . . 708N may determine whether the number of transmitted discovery signals transmitted from other neighbor relay UEs to the remote UE 702 is less than the discovery signal transmission number threshold. When the number of transmitted discovery signals counted by one or more of the neighbor relay UEs 708a . . . 708N during their respective discovery signal monitoring durations is less than the discovery signal transmission number threshold, at 724a . . . 724N, those one or more neighbor relay UEs 708a . . . 708N each transmit a respective discovery signal to the remote UE 702.

Figure 8:
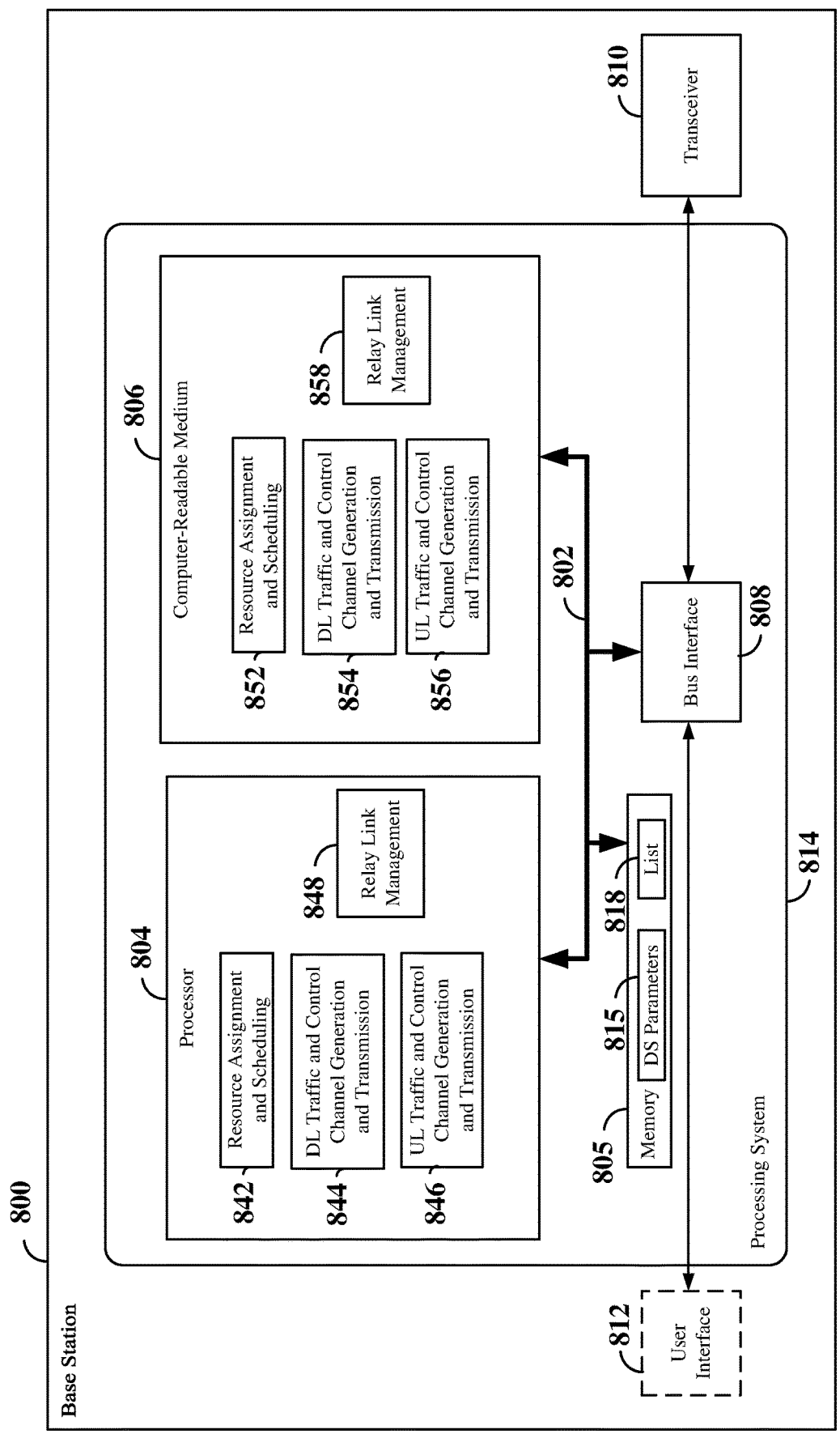
FIG. 8 is a block diagram illustrating an example of a hardware implementation for a base station employing a processing system according to some aspects.

FIG. 8 is a conceptual diagram illustrating an example of a hardware implementation for an exemplary base station 800 employing a processing system 814. For example, the base station 800 may be a base station as illustrated in any one or more of FIGS. 1, 3, 6, and 7.

The base station 800 may be implemented with a processing system 814 that includes one or more processors 804. Examples of processors 804 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 800 may be configured to perform any one or more of the functions described herein. That is, the processor 804, as utilized in a base station 800, may be used to implement any one or more of the processes described below. The processor 804 may in some instances be implemented via a baseband or modem chip and in other implementations, the processor 804 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 814 may be implemented with a bus architecture, represented generally by the bus 802. The bus 802 may include any number of interconnecting buses and bridges depending on the specific application of the processing system 814 and the overall design constraints. The bus 802 communicatively couples together various circuits including one or more processors (represented generally by the processor 804), a memory 805, and computer-readable media (represented generally by the computer-readable medium 806). The bus 802 may also link various other circuits such as timing sources, peripherals, voltage regulators, and power management circuits, which are well known in the art, and therefore, will not be described any further. A bus interface 808 provides an interface between the bus 802 and a transceiver 88. The transceiver 88 provides a means for communicating with various other apparatus over a transmission medium (e.g., air interface). Depending upon the nature of the apparatus, a user interface 812 (e.g., keypad, display, speaker, microphone, joystick) may also be provided. Of course, such a user interface 812 is optional, and may be omitted in some examples.

The processor 804 is responsible for managing the bus 802 and general processing, including the execution of software stored on the computer-readable medium 806. The software, when executed by the processor 804, causes the processing system 814 to perform the various functions described below for any particular apparatus. The computer-readable medium 806 and the memory 805 may also be used for storing data that is manipulated by the processor 804 when executing software.

One or more processors 804 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 806.

The computer-readable medium 806 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 806 may reside in the processing system 814, external to the processing system 814, or distributed across multiple entities including the processing system 814. The computer-readable medium 806 may be embodied in a computer program product. In some examples, the computer-readable medium 806 may be part of the memory 805. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 804 may include circuitry configured for various functions. For example, the processor 804 may include resource assignment and scheduling circuitry 842, configured to generate, schedule, and modify a resource assignment or grant of time—frequency resources (e.g., a set of one or more resource elements). For example, the resource assignment and scheduling circuitry 842 may schedule time—frequency resources within a plurality of time division duplex (TDD) and/or frequency division duplex (FDD) subframes, slots, and/or mini-slots to carry user data traffic and/or control information to and/or from multiple UEs.

In some examples, the resource assignment and scheduling circuitry 842 may be configured to allocate/schedule resources for the transmission of information to and reception of information from a source relay UE configured to relay the information to and from a remote UE via a sidelink. In addition, the resource assignment and scheduling circuitry 843 may further be configured to allocate resources for sidelink communication between UEs (e.g., between the source relay UE and the remote UE and/or neighbor relay UEs). In some examples, the sidelink resources may include mmWave resources.

The resource assignment and scheduling circuitry 842 may further be configured to schedule resources for the transmission of discovery signal parameters from the base station 800 to one or more UEs (e.g., neighbor relay UEs). In some examples, the resource assignment and scheduling circuitry 842 may schedule resources for broadcasting, multicasting, or unicasting the discovery signal parameters to the one or more UEs. The resource assignment and scheduling circuitry 842 may further be configured to execute resource assignment and scheduling software 852 stored in the computer-readable medium 806 to implement one or more of the functions described herein.

The processor 804 may further include downlink (DL) traffic and control channel generation and transmission circuitry 844, configured to generate and transmit downlink user data traffic and control channels within one or more subframes, slots, and/or mini-slots. The DL traffic and control channel generation and transmission circuitry 844 may operate in coordination with the resource assignment and scheduling circuitry 842 to place the DL user data traffic and/or control information onto a time division duplex (TDD) or frequency division duplex (FDD) carrier by including the DL user data traffic and/or control information within one or more subframes, slots, and/or mini-slots in accordance with the resources assigned to the DL user data traffic and/or control information by the resource assignment and scheduling circuitry 842.

For example, the DL traffic and control channel generation and transmission circuitry 844 may be configured to transmit discovery signal parameters to one or more UEs (e.g., neighbor relay UEs). The discovery signal parameters may include at least one of a discovery signal monitoring parameter or a discovery signal transmission number threshold. In some examples, the DL traffic and control channel generation and transmission circuitry 844 may broadcast, multicast, or unicast the discovery signal parameters to the one or more UEs. The DL traffic and control channel generation and transmission circuitry 844 may further be configured to transmit information (control and/or data) destined for a remote UE to a source relay UE. The DL traffic and control channel generation and transmission circuitry 844 may further be configured to execute DL traffic and control channel generation and transmission software 854 stored in the computer-readable medium 806 to implement one or more of the functions described herein.

The processor 804 may further include uplink (UL) traffic and control channel reception and processing circuitry 846, configured to receive and process uplink control channels and uplink traffic channels from one or more UEs. For example, the UL traffic and control channel reception and processing circuitry 846 may be configured to receive uplink control information (UCI) or uplink user data traffic from one or more UEs. In addition, the UL traffic and control channel reception and processing circuitry 846 may operate in coordination with the resource assignment and scheduling circuitry 842 to schedule UL user data traffic transmissions, DL user data traffic transmissions and/or DL user data traffic retransmissions in accordance with the received UCI.

In some examples, the UL traffic and control channel reception and processing circuitry 846 may be configured to receive a relay node switch message from a source relay UE indicating that a remote UE served by the source relay UE is switching from the source relay UE to another neighbor relay UE to relay information between the remote UE and the base station 800. In some examples, the relay node switch message may further include the latency requirement for performing the relay node switch. The UL traffic and control channel reception and processing circuitry 846 may further be configured to receive information (control and/or data) originated by the remote UE from the source relay UE. The UL traffic and control channel reception and processing circuitry 846 may further be configured to execute UL traffic and control channel reception and processing software 856 stored in the computer-readable medium 806 to implement one or more of the functions described herein.

The processor 804 may further include relay link management circuitry 848 configured to manage relay links between source relay UEs and remote UEs. For example, the relay link management circuitry 848 may be configured to operate in coordination with the resource assignment and scheduling circuitry 842 to schedule resources for communication over the relay links (sidelinks) In addition, the relay link management circuitry 848 may maintain a list 818 of source relay UEs and the corresponding remote UEs served by each source relay UE.

The relay link management circuitry 848 may further be configured to generate and/or maintain discovery signal parameters 815, such as a discovery signal monitoring parameter and/or a discovery signal transmission number threshold. In some examples, the relay link management circuitry 848 may generate the discovery signal monitoring parameter for a particular remote UE based on the latency requirement associated with the remote UE performing the relay node switch from the source relay UE to a neighbor relay UE. In addition, the relay link management circuitry 848 may generate the discovery signal transmission number threshold for a particular remote UE based on the latency requirement associated with performing the relay node switch or a number of candidate UEs (e.g., other remote UEs, not shown) that are currently switching from the source relay UE to another neighbor relay UE. For example, the relay link management circuitry 848 may maintain within the list 818 of remote UEs served by the source relay UE, a respective status of each relay link (e.g., in-use, idle, switching, etc.). In some examples, the relay link management circuitry 848 may include the DS parameter manager 150 and/or 312 shown in FIGS. 1 and 3. The relay link management circuitry 848 may further be configured to execute relay link management software 858 stored in the computer-readable medium 806 to implement one or more of the functions described herein.

Figure 9:
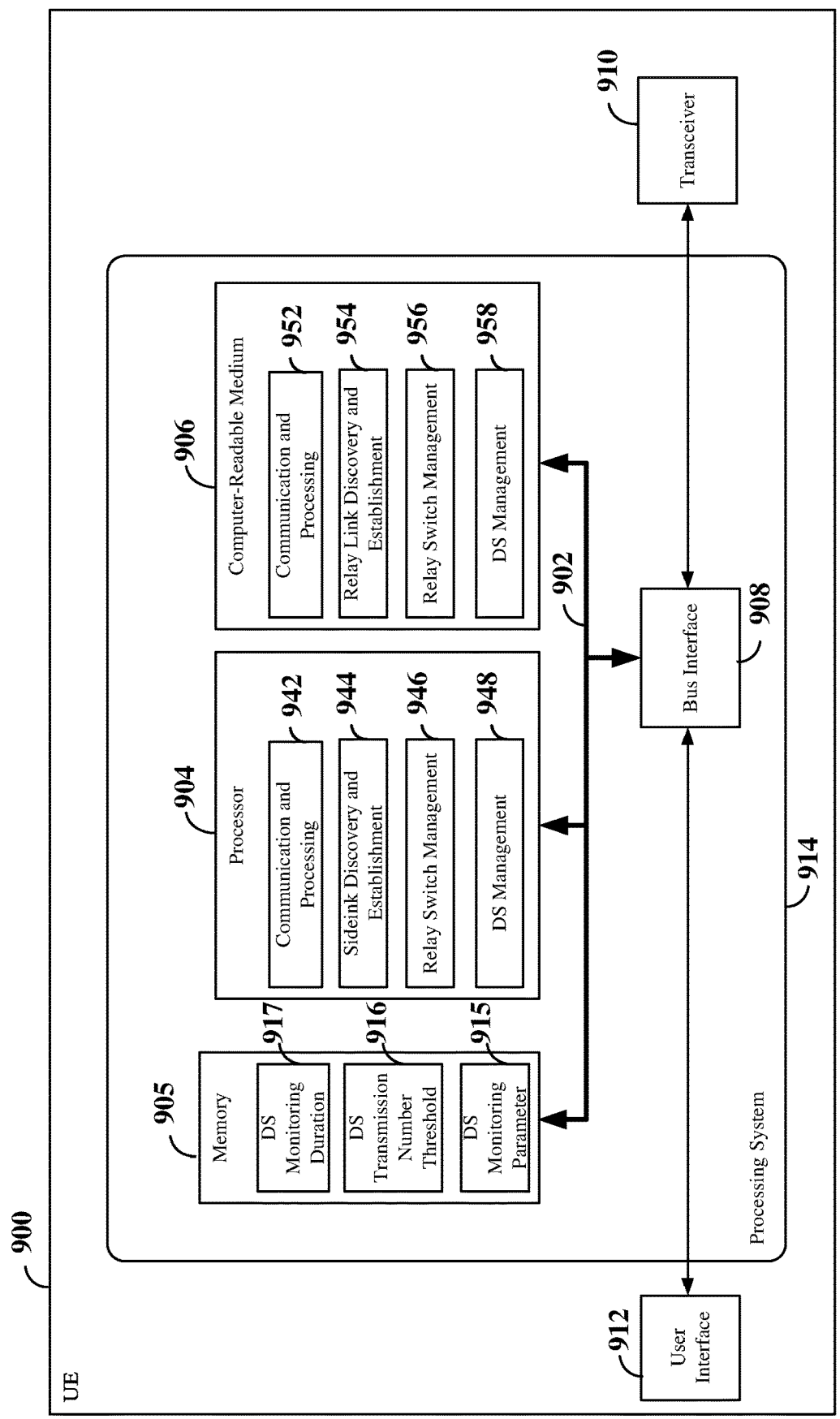
FIG. 9 is a block diagram illustrating an example of a hardware implementation for a UE employing a processing system according to some aspects.

FIG. 9 is a conceptual diagram illustrating an example of a hardware implementation for an exemplary user equipment (e.g., UE 900) employing a processing system 914. For example, the UE 900 may be a UE as illustrated in any one or more of FIGS. 1, 3, 6 and/or 7.

The processing system 914 may be substantially the same as the processing system 814 illustrated in FIG. 8, including a bus interface 908, a bus 902, memory 905, a processor 904, and a computer-readable medium 906. Furthermore, the UE 900 may include a user interface 912 and a transceiver 910 substantially similar to those described above in FIG. 8. In addition, the UE may further include one or more antenna array modules 920. In accordance with various aspects of the disclosure, an element, or any portion of an element, or any combination of elements may be implemented with the processing system 914 that includes one or more processors 904. That is, the processor 904, as utilized in a UE 900, may be used to implement any one or more of the processes described below.

In some aspects of the disclosure, the processor 904 may include circuitry configured for various functions. For example, the processor 904 may include communication and processing circuitry 942 configured to transmit and receive signals to and from a base station via a Uu interface. The communication and processing circuitry 942 may further be configured to transmit and receive to and from other UEs via respective sidelinks. In some examples, the communication and processing circuitry 942 may be configured to relay communication between the base station and one or more remote UEs via the Uu interface and respective sidelinks.

In some examples, the communication and processing circuitry 941 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 942 may be configured to generate and transmit an uplink signal, a downlink signal, or a sidelnk signal at a mmWave frequency or a sub-6 GHz frequency via the transceiver 910. The communication and processing circuitry 942 may further be configured to execute communication and processing software 952 stored on the computer-readable medium 906 to implement one or more functions described herein.

The processor 904 may further include sidelink discovery and establishment circuitry 944. The sidelink discovery and establishment circuitry 944 may be configured to operate in coordination with the communication and processing circuitry 942 to generate and transmit discovery signals to one or more remote UEs to initiate establishment of a relay link (sidelink) therebetween. The sidelink discovery and establishment circuitry 944 may further be configured to operate in coordination with the communication and processing circuitry 942 to receive one or more discovery signals from potential source relay UEs. In addition, the sidelink discovery and establishment circuitry 944 may further utilize the received discovery signal to select a source relay UE for relaying of communication between the remote UE and the base station. For example, the sidelink discovery and establishment circuitry 944 may be configured to perform a random access procedure with the selected source relay UE to establish a relay link (sidelink) therebetween. The sidelink discovery and establishment circuitry 944 may further be configured to execute relay link discovery software 954 stored on the computer-readable medium 906 to implement one or more functions described herein.

The processor 904 may further include relay switch management circuitry 946 configured to manage a relay node switch of a remote UE from a source relay UE to a neighbor relay UE. For example, the relay switch management circuitry 946 may be configured to receive a relay node switch message from a source relay UE instructing the UE 900 (e.g., the remote UE) to initiate a relay node switch to a neighbor relay UE. The relay switch management circuitry 946 may further be configured to initiate a relay node switch of a remote UE from the UE (e.g., the source relay UE) to a neighbor UE based on one or more factors. The relay switch management circuitry 946 may then be configured to transmit the relay node switch message to the remote UE instructing the remote UE to initiate the relay node switch. The relay switch management circuitry 946 may further be configured to execute relay switch management software 956 stored on the computer-readable medium 906 to implement one or more of the functions described herein.

The processor 904 may further include discovery signal (DS) management circuitry 948 configured to manage transmission of one or more discovery signals to a remote UE. In some examples, the discovery signal(s) may be transmitted during a relay node switch procedure. However, it should be understood that the discovery signal management procedure is not limited to relay node switching processes and may be utilized in other D2D discovery processes. In some examples, the DS management circuitry 948 may correspond to the DS manager 148 shown in FIG. 1 and/or DS managers 310a-310e shown in FIG. 3.

The DS management circuitry 948 may be configured to receive a discovery signal initiation message from another UE (e.g., a source relay UE) to control transmission of a discovery signal from the UE 900 to yet another UE (e.g., a remote UE). The DS management circuitry 948 may further be configured to monitor for transmitted discovery signals transmitted from other UEs to the remote UE during a DS monitoring duration 917 that may be calculated by the DS management circuitry 948 from a DS monitoring parameter 915. For example, the DS monitoring parameter 915 may include at least one probability distribution parameter associated with a probability distribution. The DS management circuitry 948 may then be configured to generate a random value that satisfies the probability distribution based on the at least one probability distribution factor. The DS management circuitry 948 may then be configured to set the DS monitoring duration 917 to the calculated random value and store the DS monitoring duration 917 within, for example, memory 905.

For example, the at least one probability distribution parameter may include a Poisson distribution factor of a Poisson distribution. The DS management circuitry 948 may be configured to randomly generate the random value corresponding to the DS monitoring duration 917 based on the Poisson distribution factor. As another example, the at least one probability distribution factor may include a maximum value and a minimum value of an even probability distribution. In some examples, the DS management circuitry 948 may be configured to randomly select a random value corresponding to the DS monitoring duration 917 between the maximum and minimum values. In some examples, the DS management circuitry 948 may be configured to calculate the DS monitoring duration 917 based on an identifier of the UE 900 and the maximum and minimum values of the even probability distribution.

In some examples, the DS monitoring parameter 915 may be hard-coded into the memory 905 of the UE 900. In other examples, the DS monitoring parameter 915 may be received from the source relay UE or the base station and stored in the memory 905. For example, the DS monitoring parameter 915 may be received via a broadcast or multicast signal from the source relay UE. As another example, the DS monitoring parameter 915 may be received via a broadcast, multicast, or unicast signal from the base station.

At expiration of the DS monitoring duration 917, the DS management circuitry 948 may further be configured to operate together with the communication and processing circuitry 942 and sidelink discovery and establishment circuitry 944 to transmit a discovery signal to the remote UE when the number of transmitted discovery signals transmitted from other UEs to the remote UE during the discovery signal monitoring duration 917 is less than a DS transmission number threshold 916. However, when the number of transmitted discovery signals transmitted by other UEs to the remote UE during the DS monitoring duration 917 is greater than or equal to the DS transmission number threshold 916, the DS management circuitry 948 is precluded from transmitting the discovery signal to the remote UE and returns to a stand-by (non-relay) mode.

The DS transmission number threshold 916 may be hard-coded into the memory 905 of the UE 900 or received from the source relay UE or the base station. For example, the DS transmission number threshold 916 may be received via a broadcast or multicast signal from the source relay UE. As another example, the DS transmission number threshold 916 may be received via a broadcast, multicast, or unicast signal from the base station. In some examples, the DS transmission number threshold 916 may be broadcast, multicast, or unicast together with the DS monitoring parameter 915. In some examples, the DS transmission number threshold 916 and/or DS monitoring parameter 915 may be transmitted concurrently with the discovery signal initiation message.

The DS management circuitry 948 may further be configured to transmit the discovery signal initiation message to one or more neighbor UEs to control transmission of a respective discovery signal from each of the neighbor UE(s) to a remote UE. The DS management circuitry 948 may further be configured to transmit the DS monitoring parameter 915 to the one or more neighbor UE(s) via, for example, broadcast or multicast signaling for use in calculating respective DS monitoring durations 917 on the neighbor UE(s). In addition, the DS management circuitry 948 may further be configured to transmit the DS transmission number threshold 916 to the one or more neighbor UE(s) to allow transmission of the respective discovery signal(s) from the neighbor UE(s) to the remote UE when the number of transmitted discovery signal transmitted from other UEs to the remote UE during the respective DS monitoring duration (s) 917 is less than the DS transmission number threshold 916.

In some examples, the DS management circuitry 948 may generate the DS monitoring parameter 915 associated with discovery signals to be transmitted to the remote UE based on the latency requirement associated with the remote UE performing the relay node switch from the UE 900 to a neighbor relay UE. In addition, the DS management circuitry 948 may generate the DS transmission number threshold associated with the remote UE based on the latency requirement associated with performing the relay node switch or a number of candidate UEs (e.g., other remote UEs) that are currently relay node switching from the UE 900 to another neighbor relay UE. The DS management circuitry 948 may further be configured to execute DS management software 958 stored on the computer-readable medium 906 to implement one or more of the functions described herein.

Figure 10:
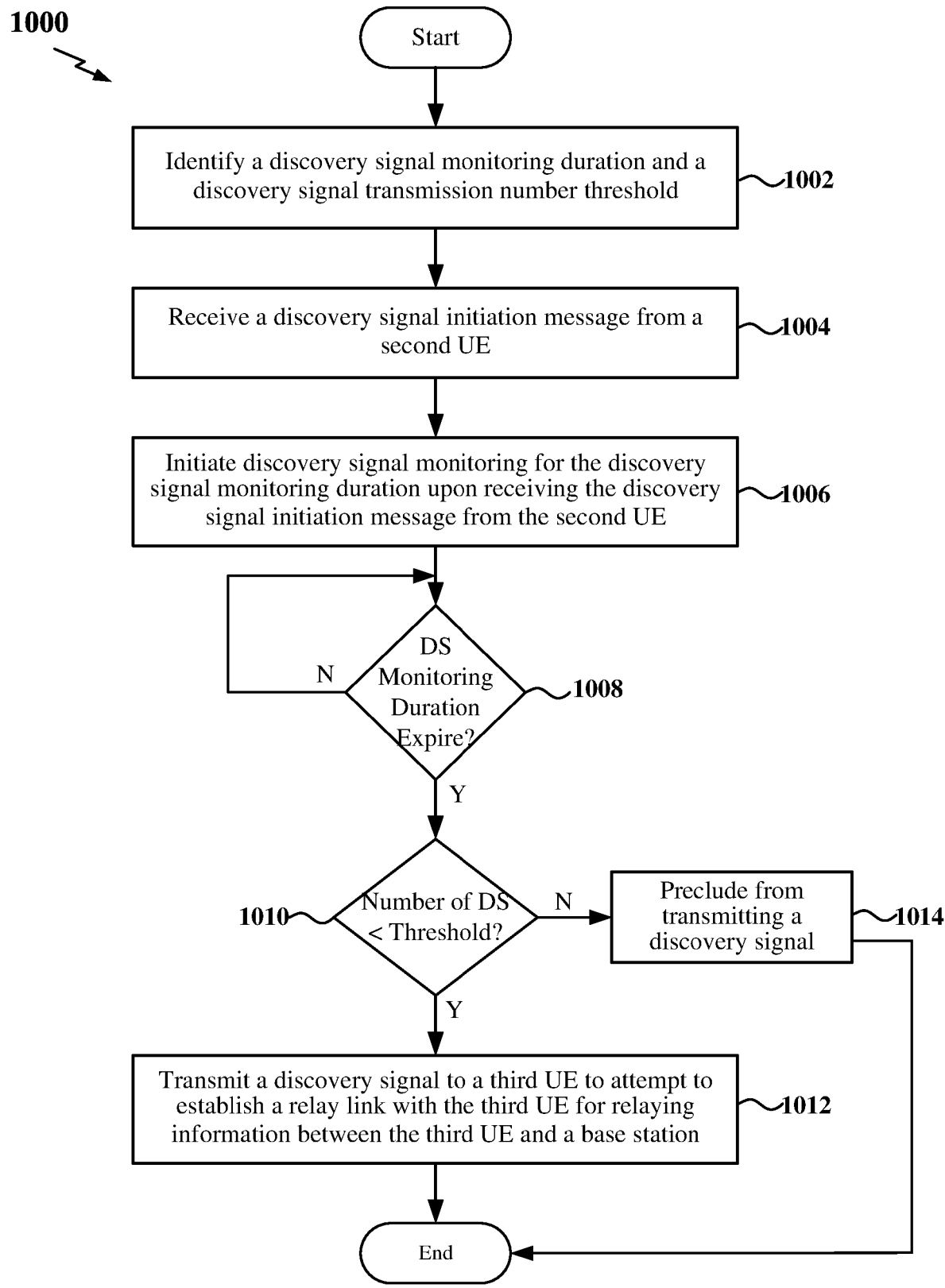
FIG. 10 is a flow chart of an exemplary method for a UE to facilitate discovery signal transmission according to some aspects.

FIG. 10 is a flow chart of a method 1000 for a UE to facilitate discovery signal transmission. As described below, some or all illustrated features may be omitted in a particular implementation within the scope of the present disclosure, and some illustrated features may not be required for implementation of all embodiments. In some examples, the method 1000 may be performed by the UE 900, as described above and illustrated in FIG. 9, by a processor or processing system, or by any suitable means for carrying out the described functions.

At block 1002, the UE (e.g., a first UE) may identify a discovery signal monitoring duration and a discovery signal transmission number threshold. In some examples, the discovery signal monitoring duration may be calculated from a discovery signal monitoring parameter. The discovery signal monitoring parameter may include, for example, at least one probability distribution parameter associated with a probability distribution. The first UE may generate a random value corresponding to the discovery signal monitoring duration that satisfies the probability distribution based on the at least one probability distribution parameter. The discovery signal monitoring parameter and discovery signal transmission number threshold may be hard-coded in memory within the first UE or received from a second UE (e.g., a source relay UE) or a base station. For example, the DS management circuitry 948, shown and described above in connection with FIG. 9 may identify the discovery signal monitoring duration and discovery signal transmission number threshold.

At block 1004, the first UE may receive a discovery signal initiation message from a second UE (e.g., a source relay UE). In some examples, the discovery signal initiation message may be transmitted concurrently with at least one of the discovery signal monitoring parameter or the discovery signal transmission number threshold. For example, the communication and processing circuitry 942 and transceiver 910, shown and described above in connection with FIG. 9, may receive the discovery signal initiation message from the second UE.

At block 1006, the first UE may initiate discovery signal monitoring for the discovery signal monitoring duration upon receiving the discovery signal initiation message from the second UE. During discovery signal monitoring, the first UE may monitor transmitted discovery signals transmitted from other UEs to a third UE (e.g., a remote UE). For example, the first UE may count the number of transmitted discovery signals transmitted from other UEs to the third UE during the discovery signal monitoring duration. For example, the DS management circuitry 948, shown and described above in connection with FIG. 9, may initiate discovery signal monitoring for the discovery signal monitoring duration on the first UE.

At block 1008, the first UE may determine whether the discovery signal monitoring duration has expired (e.g., the end of the discovery signal monitoring duration is reached). If the discovery signal monitoring duration has expired (Y branch of block 1008), at block 1010, the first UE may determine whether the number transmitted discovery signals transmitted from other UEs to the third UE is less than the discovery signal transmission number threshold. For example, the DS management circuitry 948, shown and described above in connection with FIG. 9 may determine whether the discovery signal monitoring duration has expired and whether the number of transmitted discovery signals transmitted by other UEs to the third UE during the discovery signal monitoring duration is less than the discovery signal transmission number threshold.

If the number of transmitted discovery signals transmitted by other UEs to the third UE during the discovery signal monitoring duration is less than the discovery signal transmission number threshold (Y branch of block 1010), at block 1012, the first UE may transmit a discovery signal to the third UE. For example, the DS management circuitry 948 together with the communication and processing circuitry 942, sidelink discovery and establishment circuitry 944 and transceiver 910, shown and described above in connection with FIG. 9 may generate and transmit a discovery signal to the third UE.

If the number of transmitted discovery signals transmitted by other UEs to the third UE during the discovery signal monitoring duration is greater than or equal to the discovery signal transmission number threshold (N branch of block 1010), at block 1014, the first UE may be precluded from transmitting the discovery signal to the third UE. In some examples, the first UE may discontinue monitoring for transmitted discovery signals and be precluded from transmitting the discovery signal prior to expiration of the discovery signal monitoring duration at the time when the number of transmitted discovery signals transmitted from other UEs to the third UE becomes equal to or greater than the transmission number threshold. For example, the DS management circuitry 948, shown and described above in connection with FIG. 9, may preclude the first UE from transmitting a discovery signal to the third UE.

Figure 11:
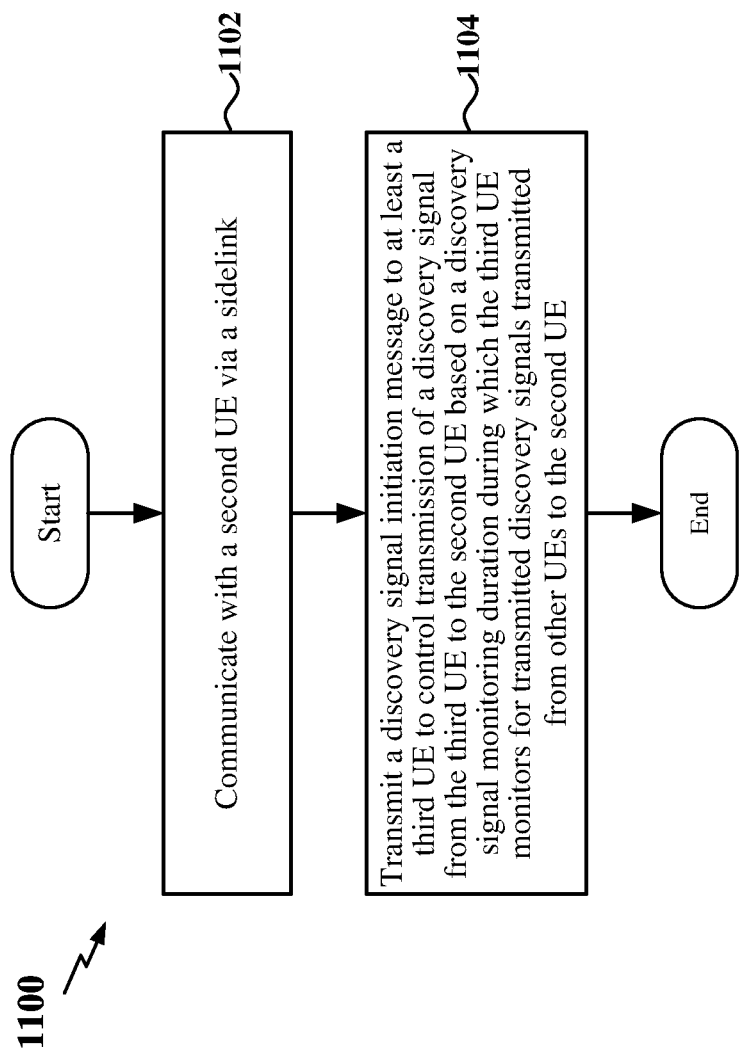
FIG. 11 is a flow chart of another exemplary method for a UE to facilitate discovery signal transmission according to some aspects.

FIG. 11 is a flow chart of another method 1100 for a UE to facilitate discovery signal transmission. As described below, some or all illustrated features may be omitted in a particular implementation within the scope of the present disclosure, and some illustrated features may not be required for implementation of all embodiments. In some examples, the method 1100 may be performed by the UE 900, as described above and illustrated in FIG. 9, by a processor or processing system, or by any suitable means for carrying out the described functions.

At block 1102, the UE (e.g., a first UE) may communicate with a second UE (e.g., a remote UE) via a sidelink. In some examples, the first UE may communicate with the second UE over the sidelink utilizing a millimeter wave carrier frequency. For example, the communication and processing circuitry 942 together with the sidelink discovery and establishment circuitry 944 and transceiver 910, shown and described above in connection with FIG. 9 may communicate with the second UE via the sidelink.

At block 1104, the first UE may transmit a discovery signal initiation message to at least a third UE to control transmission of a discovery signal from the third UE to the second UE based on a discovery signal monitoring duration during which the third UE monitors for transmitted discovery signals transmitted from other UEs to the second UE. In some examples, the first UE may broadcast or multicast the discovery signal initiation message to at least the third UE.

In some examples, the first UE may further transmit a discovery signal monitoring parameter to the third UE to facilitate calculation of the discovery signal monitoring duration by the third UE. For example, the discovery signal monitoring parameter may include at least one probability distribution parameter associated with a probability distribution. In addition, the first UE may further transmit a discovery signal transmission number threshold to the third UE to allow transmission of the discovery signal from the third UE to the second UE when the number of transmitted discovery signals transmitted from the other UEs is less than the discovery signal transmission number threshold during the discovery signal monitoring duration of the third UE. In some examples, the discovery signal monitoring parameter and/or discovery signal transmission number threshold may be transmitted concurrently with the discovery signal initiation message.

In some examples, the first UE may determine the discovery signal monitoring parameter based on the latency requirement associated with the second UE performing a relay node switch from the first UE to a neighbor relay UE (e.g., the third UE). In addition, the first UE may determine the DS transmission number threshold associated with the second UE based on the latency requirement associated with performing the relay node switch or a number of candidate UEs (e.g., other remote UEs) that are currently relay node switching from the first UE to another neighbor relay UE. For example, the DS management circuitry 948, together with the communication and processing circuitry 942 and transceiver 910, shown and described above in connection with FIG. 9 may transmit the discovery signal initiation message to at least the third UE.

Figure 12:
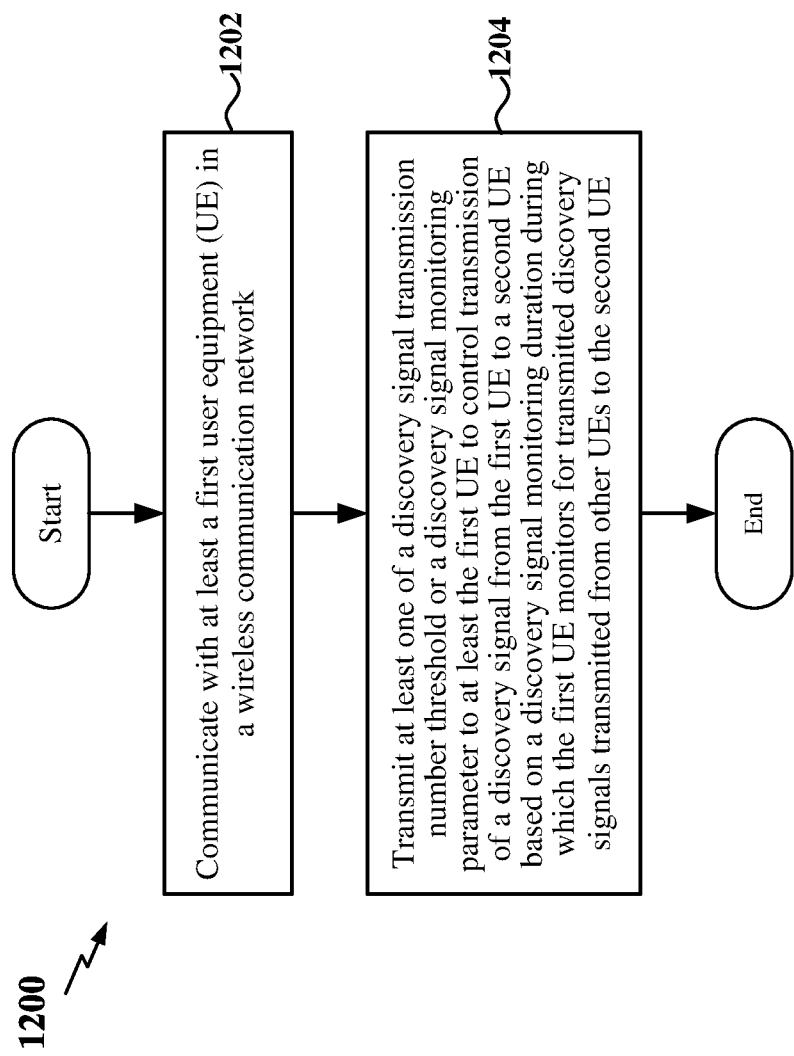
FIG. 12 is a flow chart of another exemplary method for a base station to facilitate discovery signal transmission between UEs according to some aspects.

FIG. 12 is a flow chart of a method 1200 for a base station to facilitate discovery signal transmission between UEs. As described below, some or all illustrated features may be omitted in a particular implementation within the scope of the present disclosure, and some illustrated features may not be required for implementation of all embodiments. In some examples, the method 1000 may be performed by the base station 800, as described above and illustrated in FIG. 8, by a processor or processing system, or by any suitable means for carrying out the described functions.

At bock 1202, the base station may communicate with at least a first user equipment (UE) in a wireless communication network. For example, the base station may communicate with at least the first UE over a Uu interface. For example, the resource assignment and scheduling circuitry 842, together with the DL traffic and control channel generation and transmission circuitry 844 and UL traffic and control channel generation and transmission circuitry 846, as shown and described above in connection with FIG. 8 may communicate with at least the first UE.

At block 1204, the base station may transmit at least one of a discovery signal transmission number threshold or a discovery signal monitoring parameter to at least the first UE to control transmission of a discovery signal from the first UE to a second UE based on a discovery signal monitoring duration during which the first UE monitors for transmitted discovery signals transmitted from other UEs to the second UE. In some examples, the discovery signal monitoring parameter may include at least one probability distribution parameter associated with a probability distribution. In some examples, the base station may broadcast, multicast, or unicast the discovery signal monitoring parameter and/or the discovery signal transmission number threshold to at least the first UE.

In some examples, the base station may determine the discovery signal monitoring parameter based on a latency requirement associated the second UE performing a relay node switch. In addition, the base station may determine the DS transmission number threshold associated with the second UE based on the latency requirement associated with performing the relay node switch or a number of candidate UEs (e.g., other remote UEs) that are currently relay node switching from a third UE to another neighbor relay UE (e.g., the first UE). For example, the relay link management circuitry 848, together with the DL traffic and control channel generation and transmission circuitry 844 and transceiver 810, shown and described above in connection with FIG. 8, may transmit the discovery signal transmission number threshold and/or the discovery signal monitoring parameter to at least the first UE.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, and 6-9 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method for wireless communication at a first user equipment (UE) in a wireless communication network, the method comprising:
   receiving a discovery signal initiation message from a second UE;
   initiating discovery signal monitoring for a discovery signal monitoring duration based on receiving the discovery signal initiation message from the second UE; and
   based on expiration of the discovery signal monitoring duration:
      determining whether a number of other discovery signals from other UEs is less than a discovery signal transmission number threshold; and
      transmitting a discovery signal to a third UE based on the number of other discovery signals from the other UEs is less than the discovery signal transmission number threshold.

2. The method of claim 1, further comprising:
   receiving the discovery signal transmission number threshold and a discovery signal monitoring parameter from the second UE or a network entity; and
   calculating the discovery signal monitoring duration based on the discovery signal monitoring parameter.

3. The method of claim 2, wherein the discovery signal monitoring parameter comprises at least one probability distribution parameter associated with a probability distribution.

4. The method of claim 3, wherein the calculating the discovery signal monitoring duration further comprises:
   generating a random value as the discovery signal monitoring duration that satisfies the probability distribution based on the at least one probability distribution parameter.

5. The method of claim 3, wherein the calculating the discovery signal monitoring duration further comprises:
   calculating the discovery signal monitoring duration based on an identifier of the first UE and the at least one probability distribution parameter.

6. The method of claim 2, wherein the receiving the discovery signal transmission number threshold and the discovery signal monitoring parameter further comprises:
   receiving at least one of the discovery signal transmission number threshold or the discovery signal monitoring parameter from the second UE via a broadcast signal or a multicast signal.

7. The method of claim 2, wherein the receiving the discovery signal transmission number threshold and the discovery signal monitoring parameter further comprises:
   receiving at least one of the discovery signal transmission number threshold or the discovery signal monitoring parameter from a network entity via a broadcast signal, a multicast signal, or a unicast signal.

8. The method of claim 1, wherein the identifying the discovery signal monitoring duration and the discovery signal transmission number threshold further comprises:
retrieving at least one of the discovery signal transmission number threshold or a discovery signal monitoring parameter hard-coded within a memory of the first UE; and
calculating the discovery signal monitoring duration based on the discovery signal monitoring parameter.

9. The method of claim 1, wherein the discovery signal monitoring duration comprises at least one of a number of slots, a duration of time, or a number of discovery signal resources via which discovery signals are transmitted.

10. The method of claim 1, further comprising:
precluding transmission of the discovery signal to the third UE when the number of other discovery signals from the other UEs is greater than or equal to the discovery signal transmission number threshold.

11. The method of claim 1, further comprising:
establishing a relay link with the third UE for relaying information between the third UE and a network entity in response to the discovery signal.

12. A method of wireless communication at a first user equipment (UE) in a wireless communication network, the method comprising:
communicating with a second UE via a sidelink to relay information between a network entity and the second UE;
transmitting a relay node switch message to the second UE instructing the second UE to perform a relay node switch;
transmitting a discovery signal initiation message to at least a third UE, the discovery signal initiation message comprising at least one parameter indicating a discovery signal monitoring duration to monitor for other discovery signals from other UEs to the second UE;
transmitting a discovery signal monitoring parameter to the third UE, wherein a calculation of the discovery signal monitoring duration is based on the discovery signal monitoring parameter; and
determining the discovery signal monitoring parameter based on a latency requirement associated with performance of the relay node switch.

13. The method of claim 12, wherein the discovery signal monitoring parameter comprises at least one probability distribution parameter associated with a probability distribution.

14. The method of claim 12, further comprising:
transmitting a discovery signal transmission number threshold to the third UE, wherein the discovery signal transmission number threshold indicates a number of other discovery signals from the other UEs during the discovery signal monitoring duration.

15. The method of claim 14, further comprising:
determining the discovery signal transmission number threshold based on the latency requirement associated with performance of the relay node switch or a number of candidate UEs to be relay node switched from the first UE.

16. The method of claim 14, further comprising:
transmitting at least one of the discovery signal transmission number threshold or the discovery signal monitoring parameter to a plurality of UEs comprising the third UE via a broadcast signal or a multicast signal.

17. The method of claim 14, further comprising:
transmitting the discovery signal monitoring parameter, the discovery signal transmission number threshold, and the discovery signal initiation message concurrently to at least the third UE.

18. The method of claim 12, wherein transmitting the discovery signal initiation message further comprises:
transmitting the discovery signal initiation message to a plurality of UEs comprising the third UE via a broadcast signal or a multicast signal.

19. The method of claim 12, wherein the discovery signal monitoring duration comprises a number of slots, a duration of time, or a number of discovery signal resources via which discovery signals are transmitted.

20. The method of claim 12, further comprising:
communicating with the second UE over the sidelink utilizing a millimeter wave carrier frequency.

21. A method of wireless communication at a network entity in a wireless communication network, the method comprising:
communicating with a first user equipment (UE) in the wireless communication network;
communicating with a second UE via a third UE in a relay configuration;
transmitting at least one of a discovery signal transmission number threshold or a discovery signal monitoring parameter to at least the first UE, wherein a calculation of a discovery signal monitoring duration is based on the discovery signal monitoring parameter, wherein the discovery signal monitoring duration is to monitor for other discovery signals from other UEs to the second UE; and
determining the discovery signal monitoring parameter based on a latency requirement associated with performance of a relay node switch from the third UE.

22. The method of claim 21, wherein the transmitting at least one of the discovery signal transmission number threshold or the discovery signal monitoring parameter to at least the first UE further comprises:
transmitting at least one of the discovery signal transmission number threshold or the discovery signal monitoring parameter to a plurality of UEs comprising the first UE via a broadcast signal, a multicast signal, or respective unicast signals.

23. The method of claim 21, wherein the transmitting at least one of the discovery signal transmission number threshold or the discovery signal monitoring parameter to at least the first UE further comprises:
transmitting the discovery signal monitoring parameter to the first UE, wherein the calculation of the discovery signal monitoring duration is based on the discovery signal monitoring parameter.

24. The method of claim 23, wherein the discovery signal monitoring parameter comprises at least one probability distribution parameter associated with a probability distribution.

25. The method of claim 21, wherein the transmitting at least one of the discovery signal transmission number threshold or the discovery signal monitoring parameter to at least the first UE further comprises:
transmitting the discovery signal transmission number threshold to the first UE, wherein the discovery signal transmission number threshold indicates a number of the other discovery signals from the other UEs during the discovery signal monitoring duration.

26. The method of claim 21, further comprising:
determining the discovery signal transmission number threshold based on the latency requirement associated with performing a relay node switch from the third UE or a number of candidate UEs to be relay node switched from the third UE.

27. A first user equipment (UE) configured for wireless communication, comprising:
one or more processors;
one or more memories coupled to the one or more processors, the one or more processors being configured to:
receive a discovery signal initiation message from a second UE;
initiate discovery signal monitoring for a discovery signal monitoring duration based on receiving the discovery signal initiation message from the second UE; and
based on expiration of the discovery signal monitoring duration:
determine whether a number of other discovery signals from other UEs is less than a discovery signal transmission number threshold; and
transmit a discovery signal to a third UE based on the number of other discovery signals from the other UEs is less than the discovery signal transmission number threshold.

28. The first UE of claim 27, wherein the one or more processors are further configured to:
receive the discovery signal transmission number threshold and a discovery signal monitoring parameter from the second UE or a network entity; and
calculate the discovery signal monitoring duration based on the discovery signal monitoring parameter.

29. The first UE of claim 28, wherein the discovery signal monitoring parameter comprises at least one probability distribution parameter associated with a probability distribution.

30. A network entity configured for wireless communication, comprising:
one or more processors;
one or more memories coupled to the one or more processors, the one or more processors being configured to:
communicate with at least a first user equipment (UE);
communicate with a second UE via a third UE in a relay configuration;
transmit at least one of a discovery signal transmission number threshold or a discovery signal monitoring parameter to at least the first UE, wherein a calculation of a discovery signal monitoring duration is based on the discovery signal monitoring parameter, wherein the discover signal monitoring duration is to monitor for other discovery signals from other UEs to the second UE; and
determine the discovery signal monitoring parameter based on a latency requirement associated with performance of a relay node switch from the third UE.

31. The network entity of claim 30, wherein the one or more processors is are further configured to:
determine the discovery signal transmission number threshold based on a latency requirement associated with performance of the relay node switch from the third UE or a number of candidate UEs to be relay node switched from the third UE.

32. A first user equipment (UE) configured for wireless communication, comprising:
one or more processors;
one or more memories coupled to the one or more processors, the one or more processors being configured to:
communicate with a second UE via a sidelink to relay information between a network entity and the second UE;
transmit a relay node switch message to the second UE to instruct the second UE to perform a relay node switch;
transmit a discovery signal initiation message to at least a third UE, the discovery signal initiation message comprising at least one parameter that indicates a discovery signal monitoring duration to monitor for other discovery signals from other UEs to the second UE;
transmit a discovery signal monitoring parameter to the third UE, wherein a calculation of the discovery signal monitoring duration is based on the discovery signal monitoring parameter; and
determine the discovery signal monitoring parameter based on a latency requirement associated with performance of the relay node switch.

33. The first UE of claim 32, wherein the discovery signal monitoring parameter comprises at least one probability distribution parameter associated with a probability distribution.

34. The first UE of claim 32, wherein the one or more processors are further configured to:
transmit a discovery signal transmission number threshold to the third UE, wherein the discovery signal transmission number threshold indicates a number of other discovery signals from the other UEs during the discovery signal monitoring duration.

* * * * *